Figure 1:
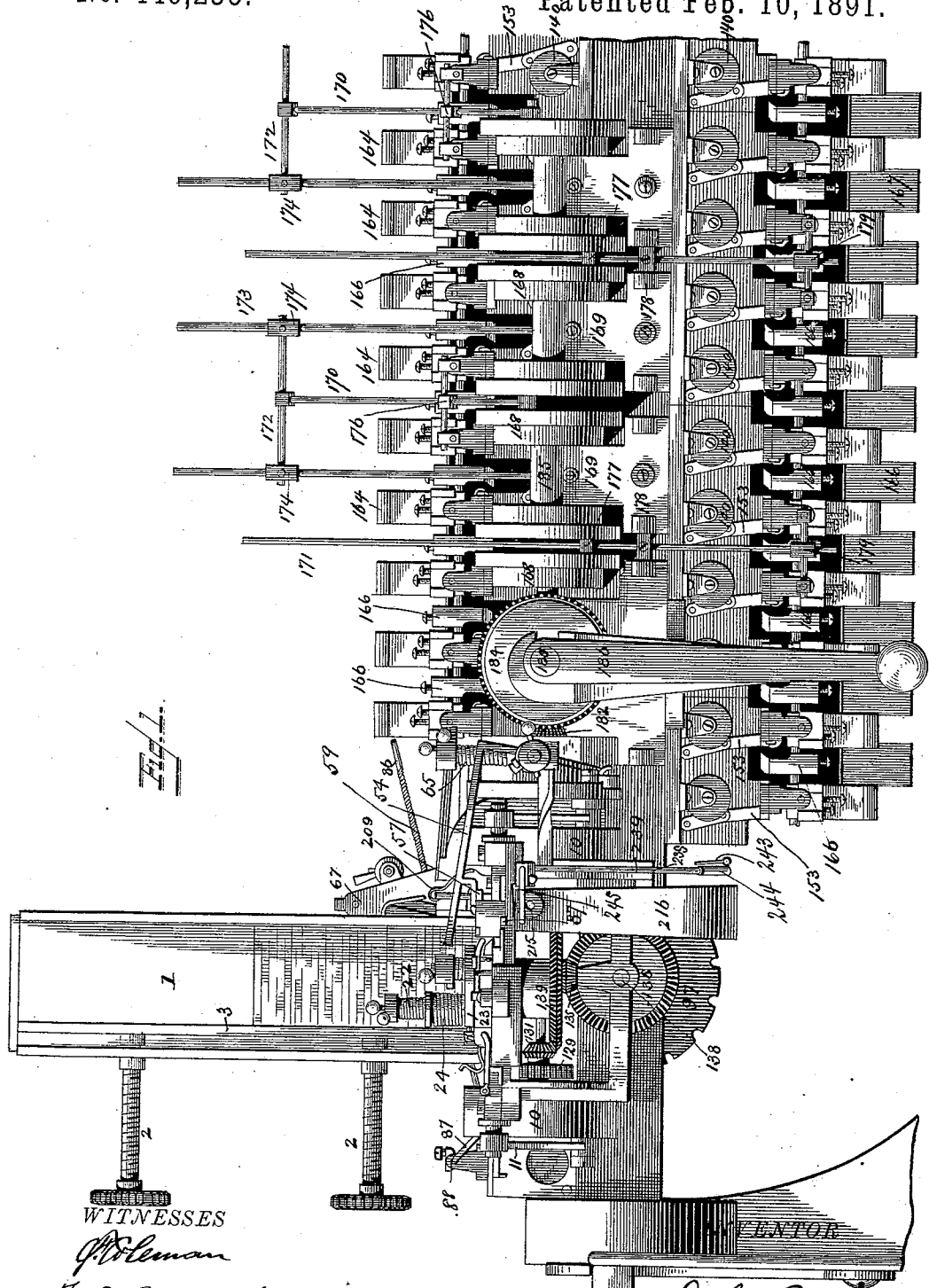

(No Model.)  23 Sheets—Sheet 1.
J. PATTEN.
TYPE DISTRIBUTING MACHINE.
No. 446,235. Patented Feb. 10, 1891.

WITNESSES  INVENTOR

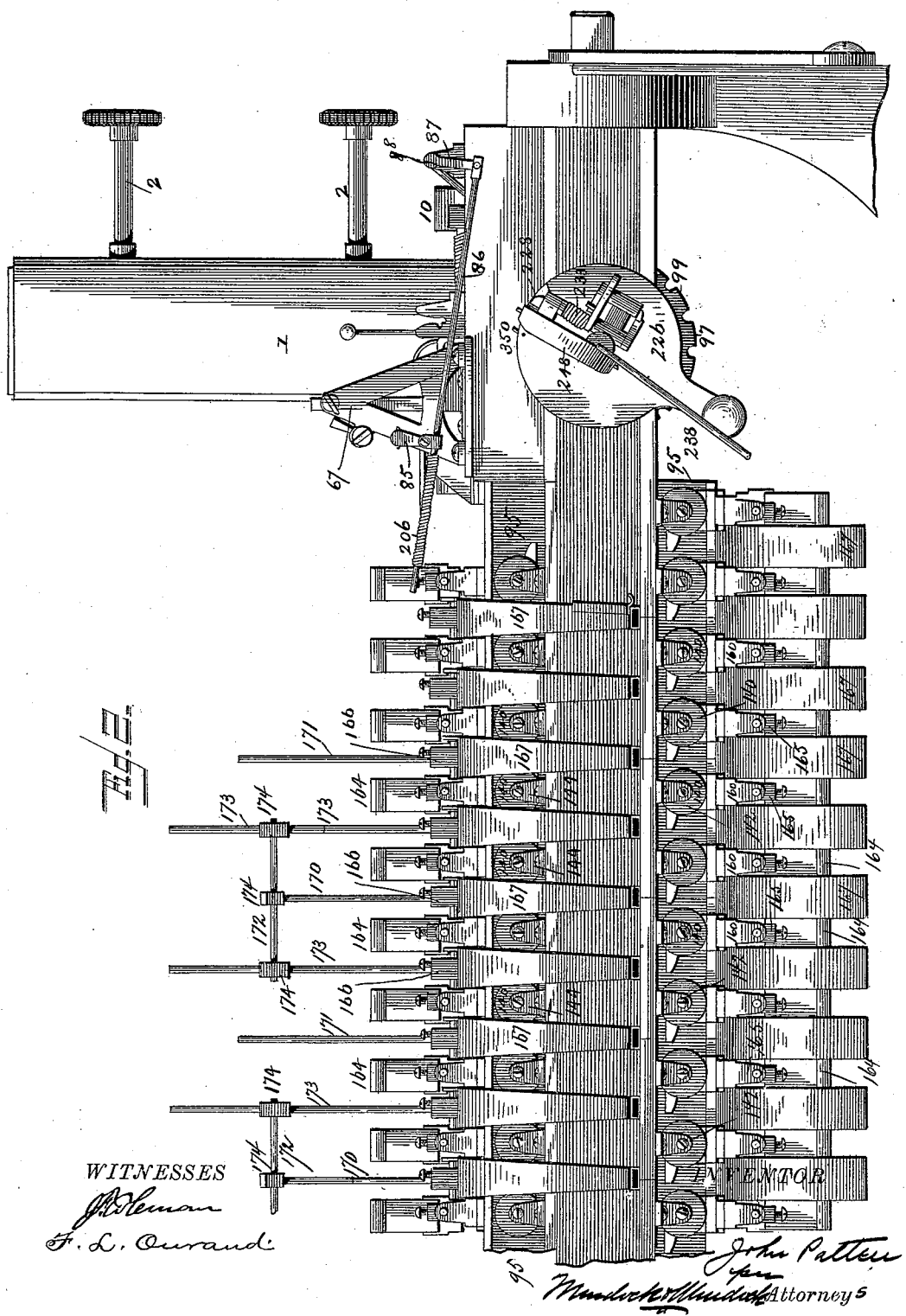

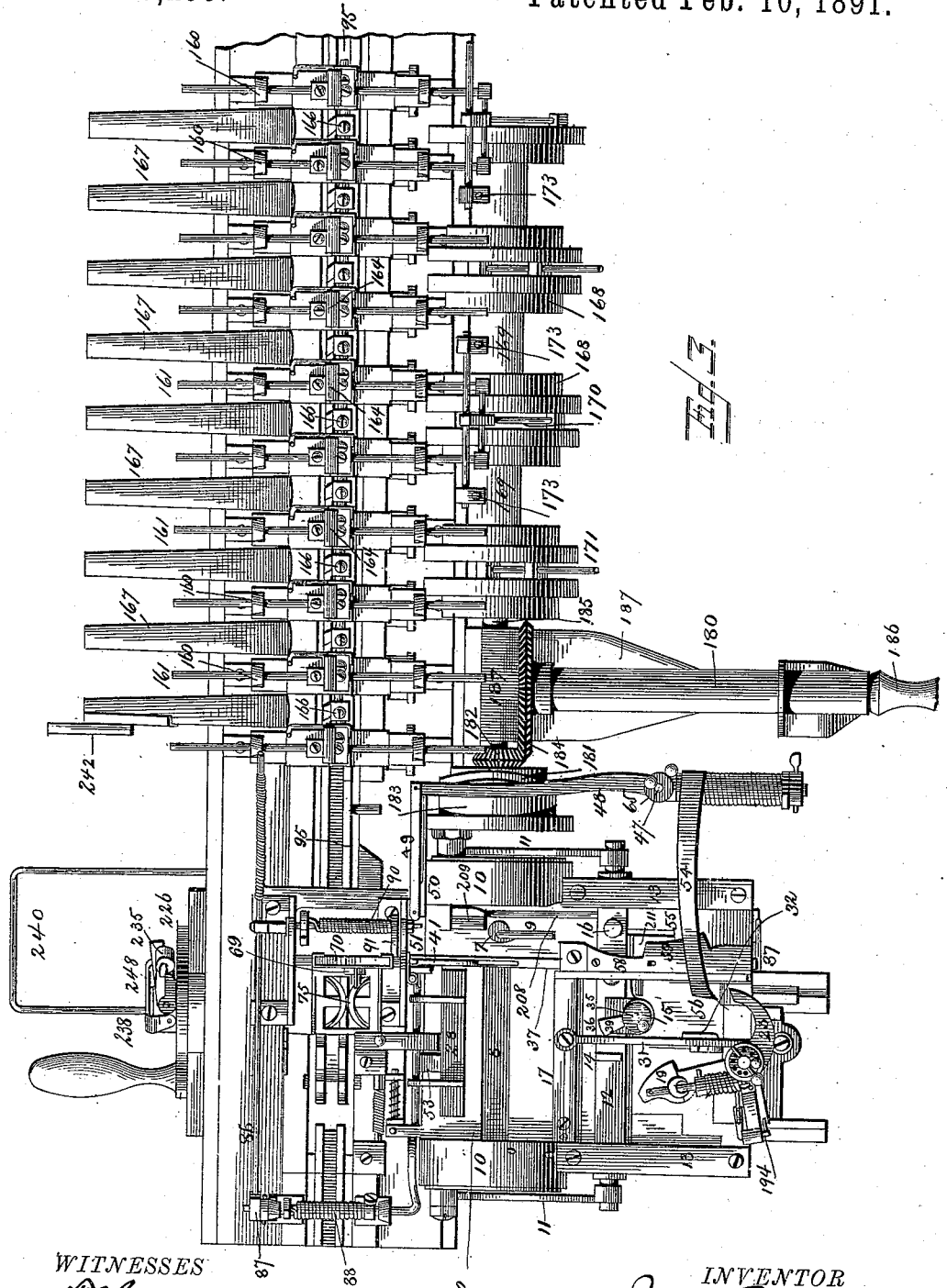

(No Model.) 23 Sheets—Sheet 4.
J. PATTEN.
TYPE DISTRIBUTING MACHINE.
No. 446,235. Patented Feb. 10, 1891.
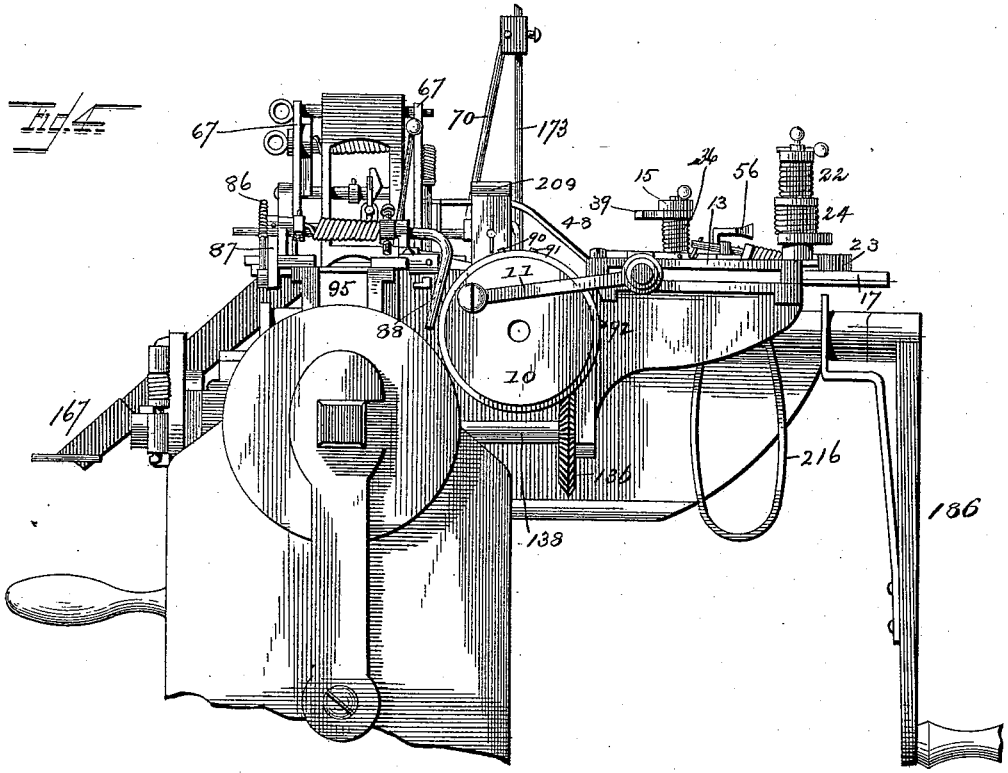
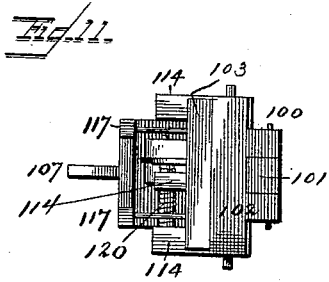
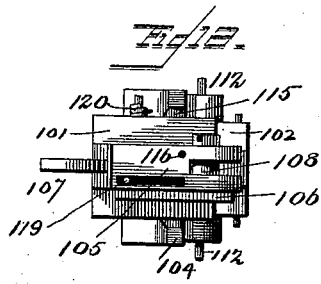
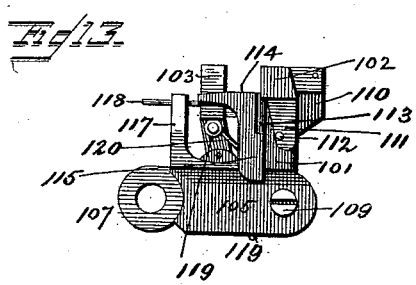
WITNESSES
INVENTOR
John Patten
Attorneys (No Model.)  
23 Sheets—Sheet 5.
J. PATTEN.
TYPE DISTRIBUTING MACHINE.
No. 446,235.  
Patented Feb. 10, 1891.
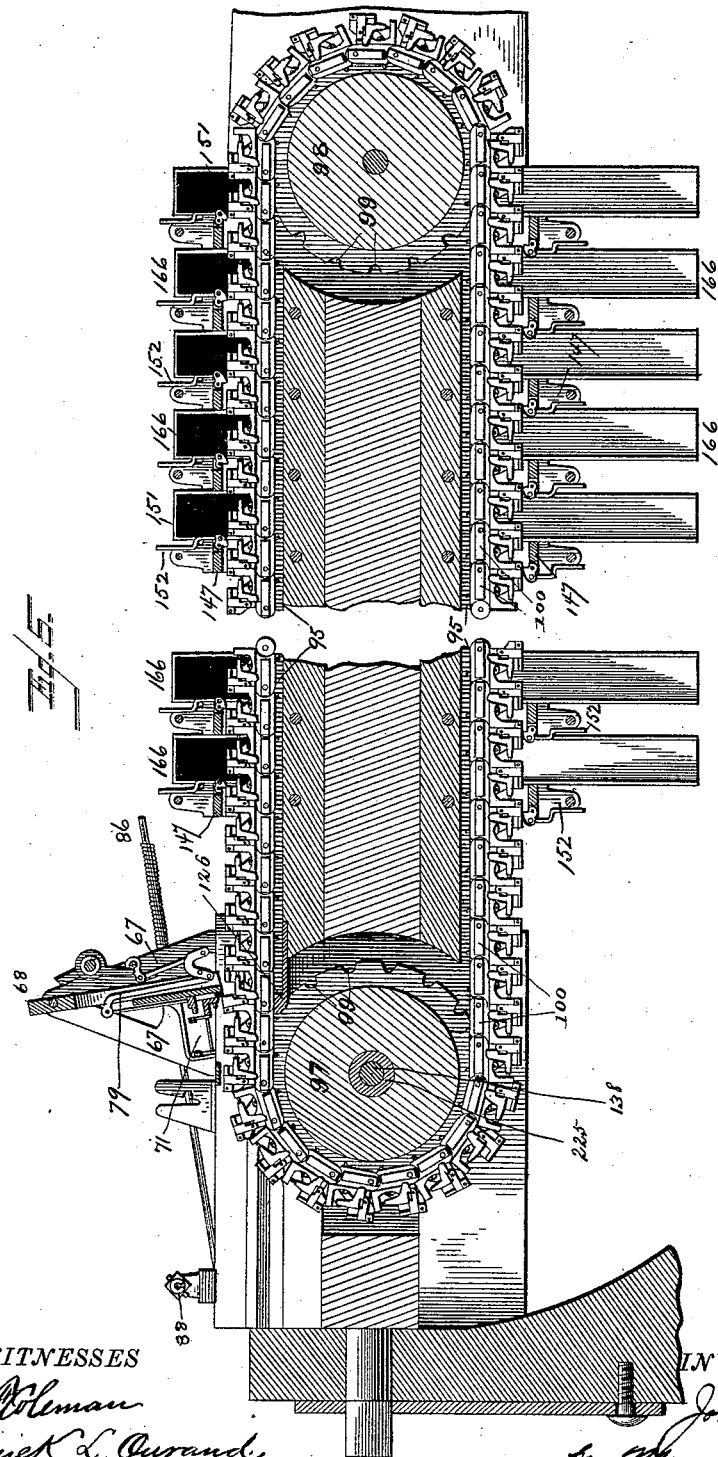
WITNESSES  
INVENTOR

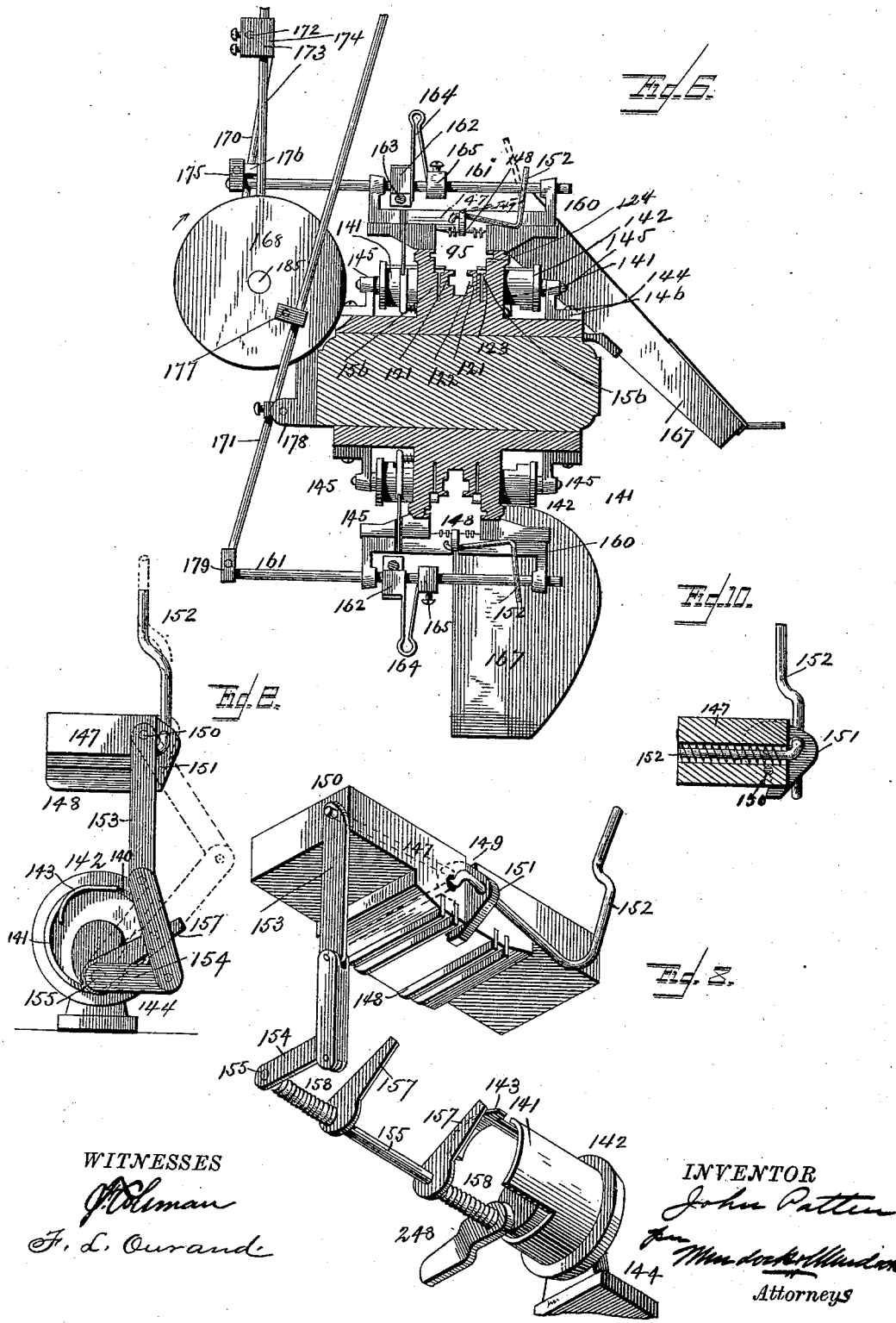

(No Model.)
23 Sheets—Sheet 7.
J. PATTEN.
TYPE DISTRIBUTING MACHINE.
No. 446,235. Patented Feb. 10, 1891.
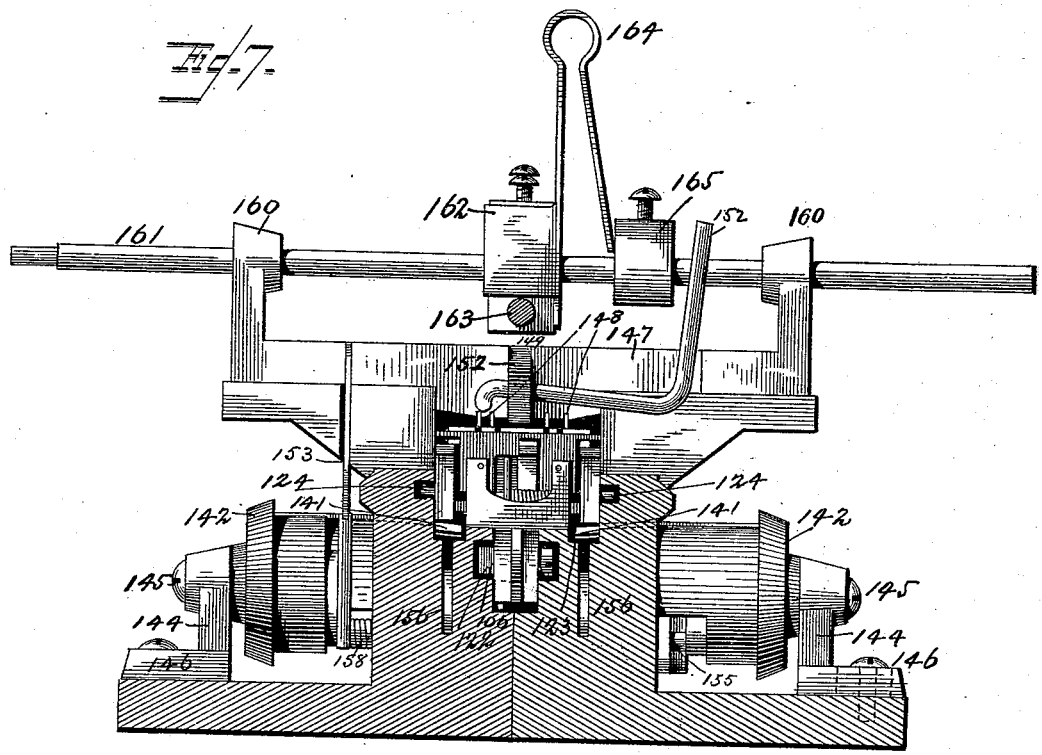
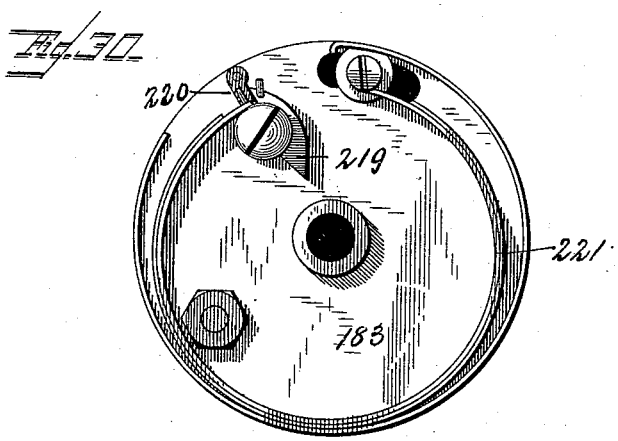
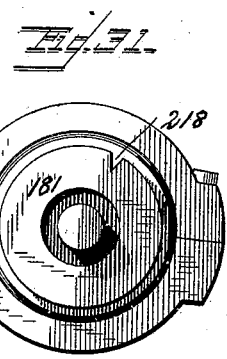
WITNESSES
INVENTOR
John Patten
Attorneys (No Model.)  
23 Sheets—Sheet 8.
J. PATTEN.
TYPE DISTRIBUTING MACHINE.
No. 446,235. Patented Feb. 10, 1891.
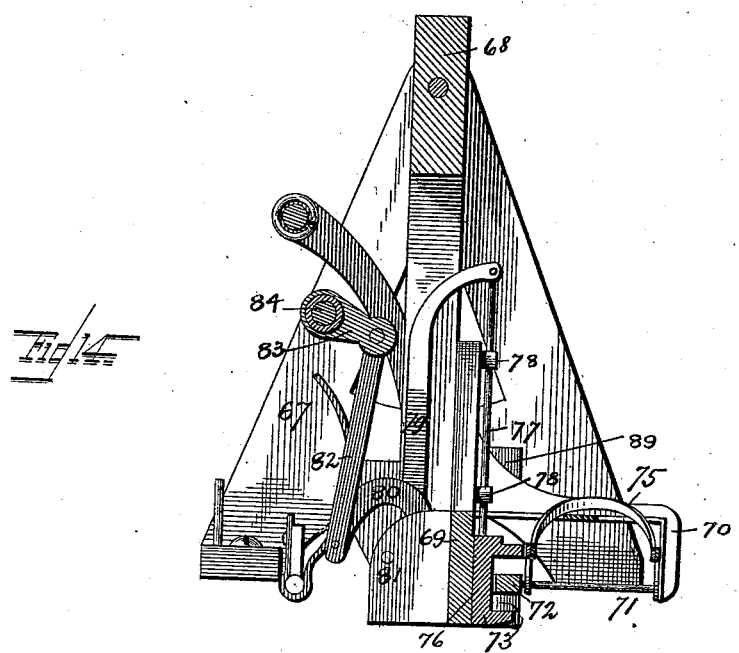
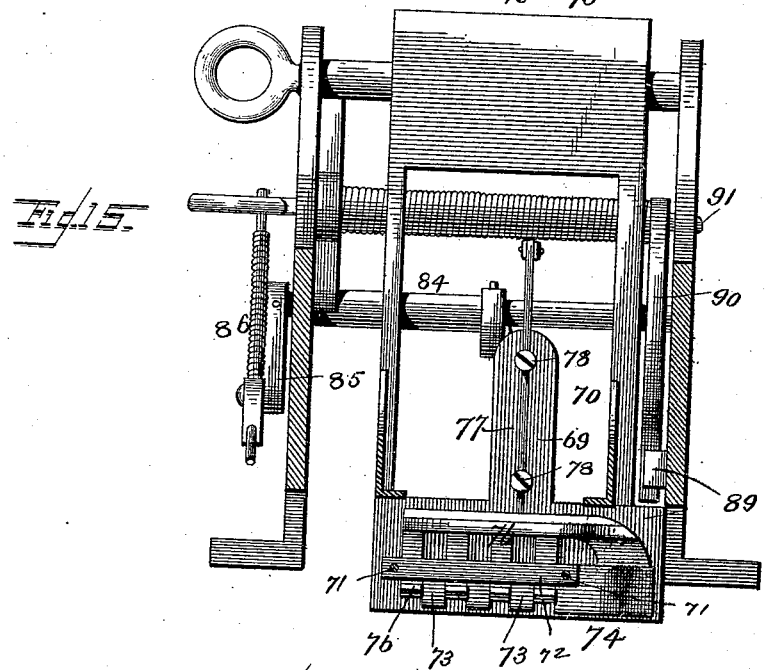
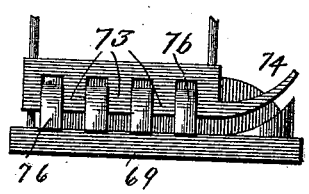
WITNESSES  
INVENTOR  
*Attorneys*

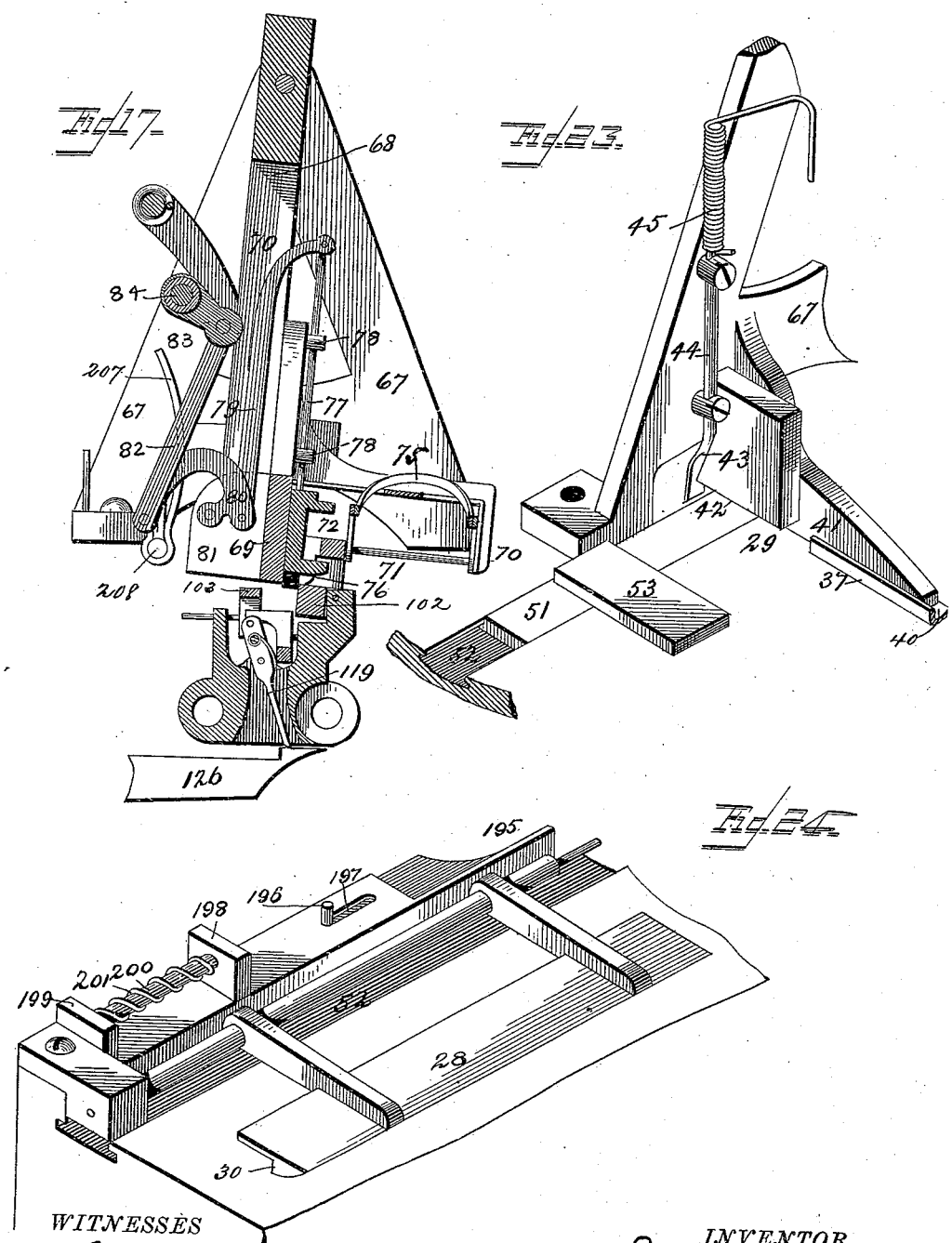

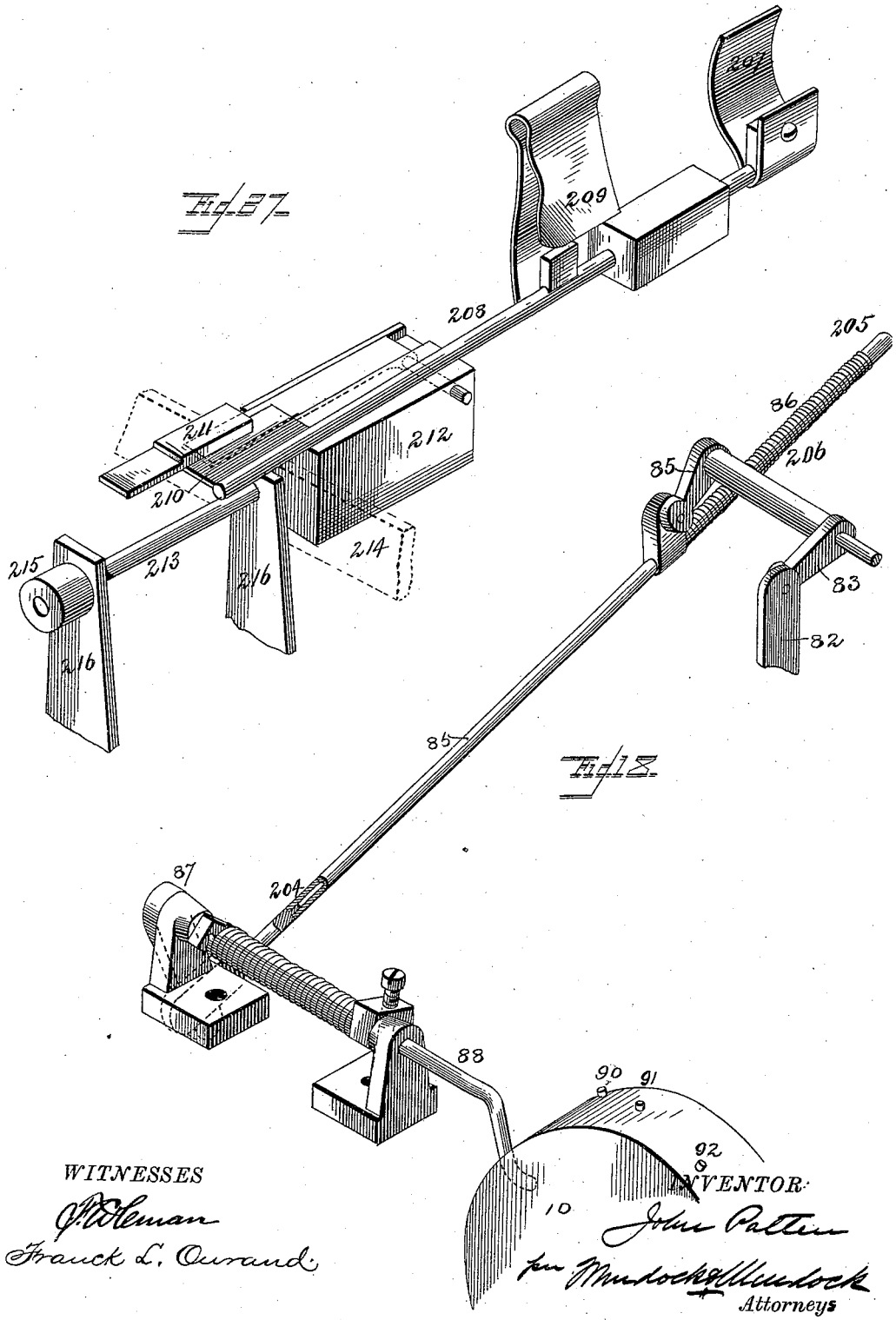

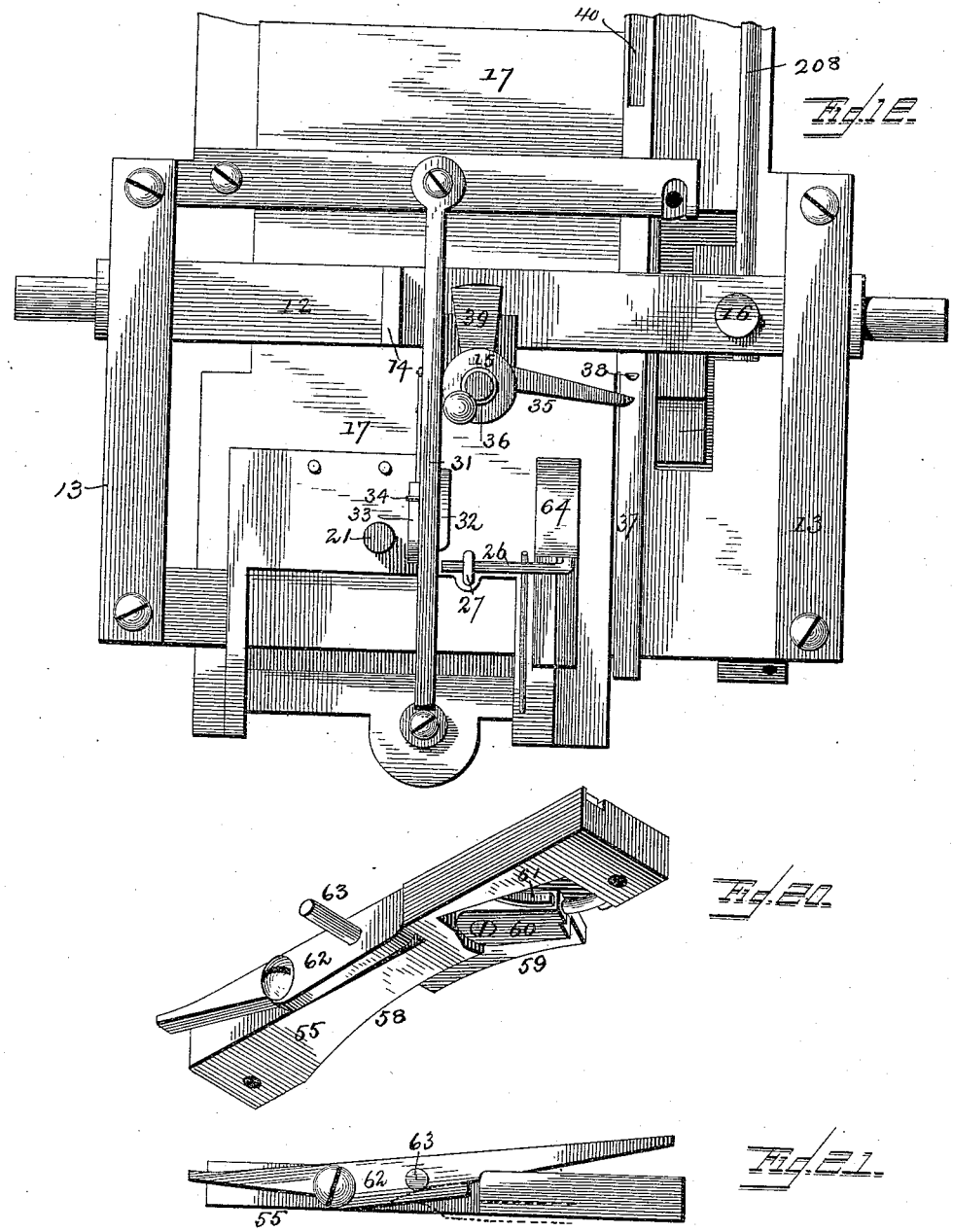

(No Model.) 23 Sheets—Sheet 12.
J. PATTEN.
TYPE DISTRIBUTING MACHINE.
No. 446,235. Patented Feb. 10, 1891.
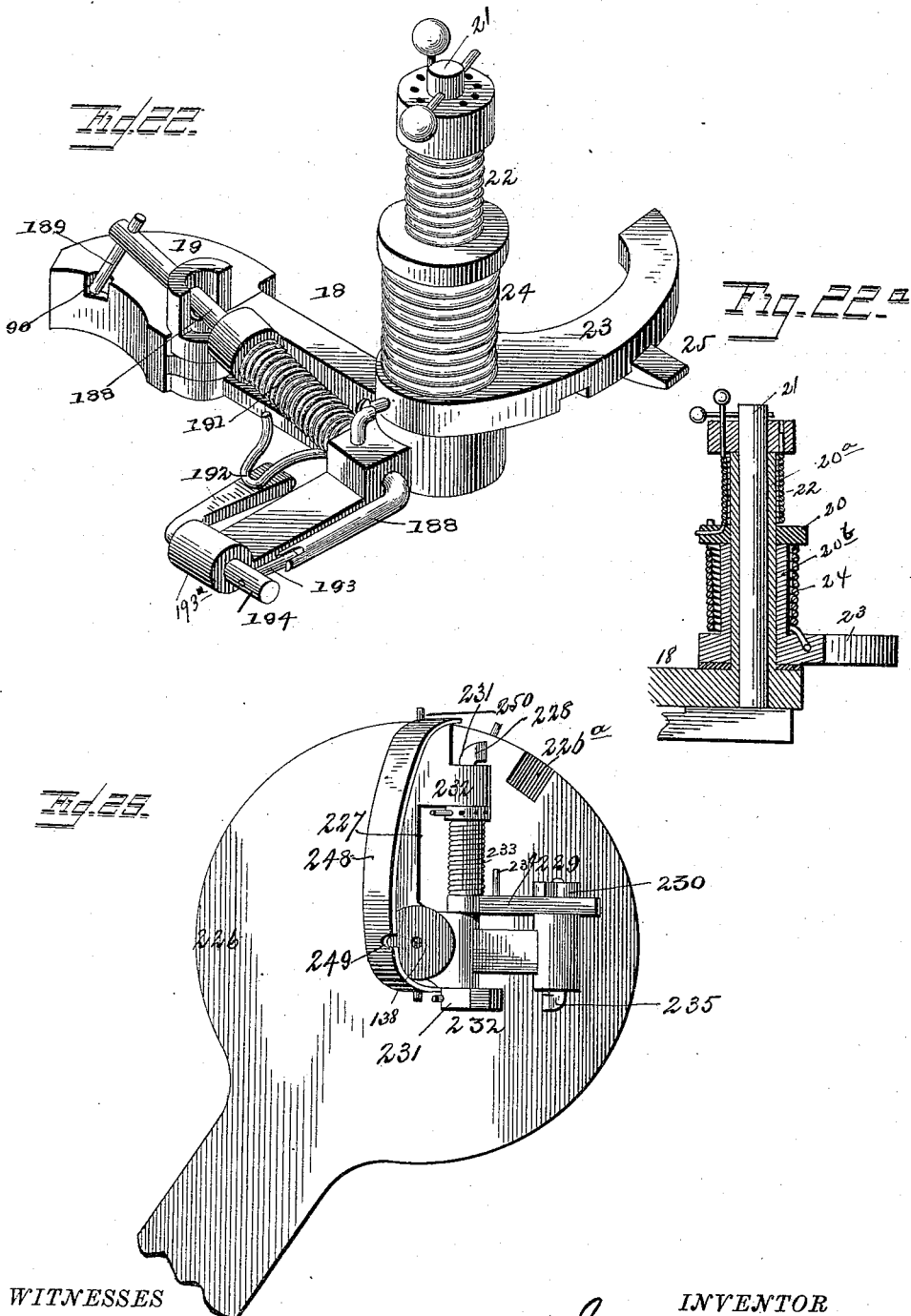
WITNESSES
INVENTOR (No Model.)
23 Sheets—Sheet 13.
J. PATTEN.
TYPE DISTRIBUTING MACHINE.
No. 446,235. Patented Feb. 10, 1891.
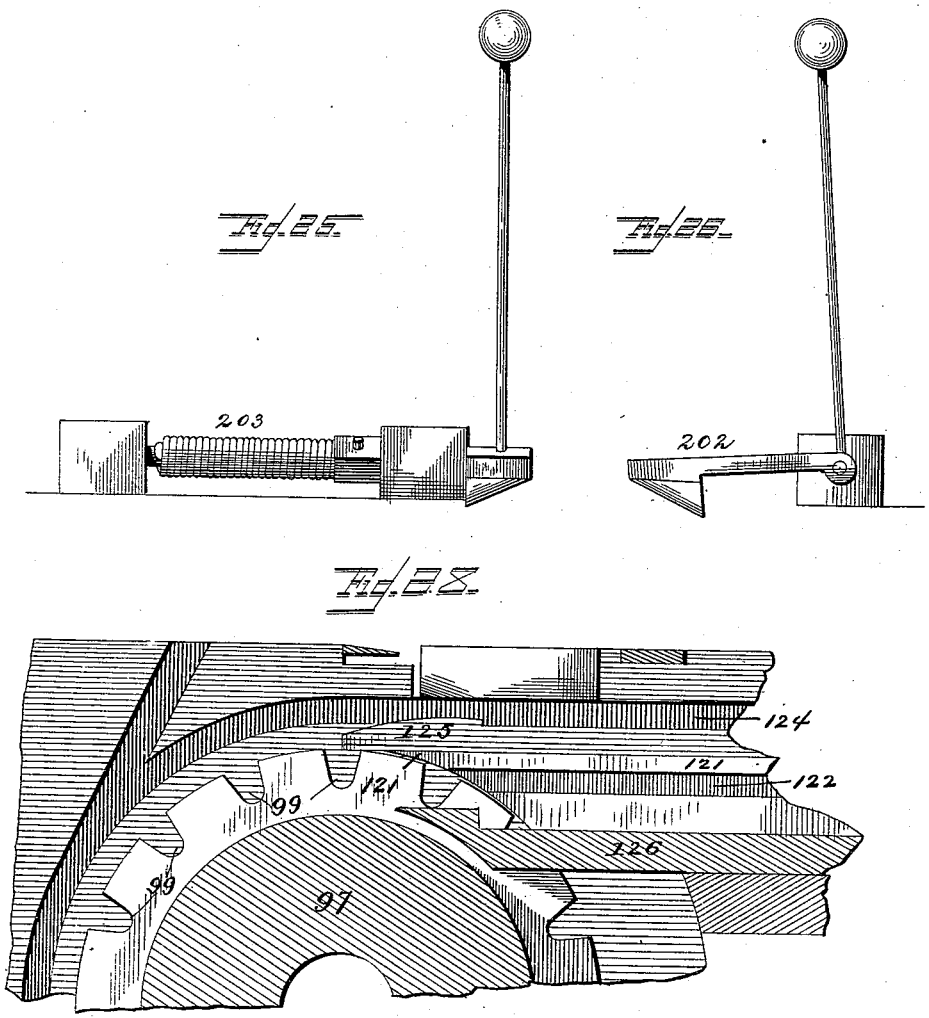
WITNESSES
INVENTOR (No Model.)
23 Sheets—Sheet 14.
J. PATTEN.
TYPE DISTRIBUTING MACHINE.
No. 446,235.  Patented Feb. 10, 1891.
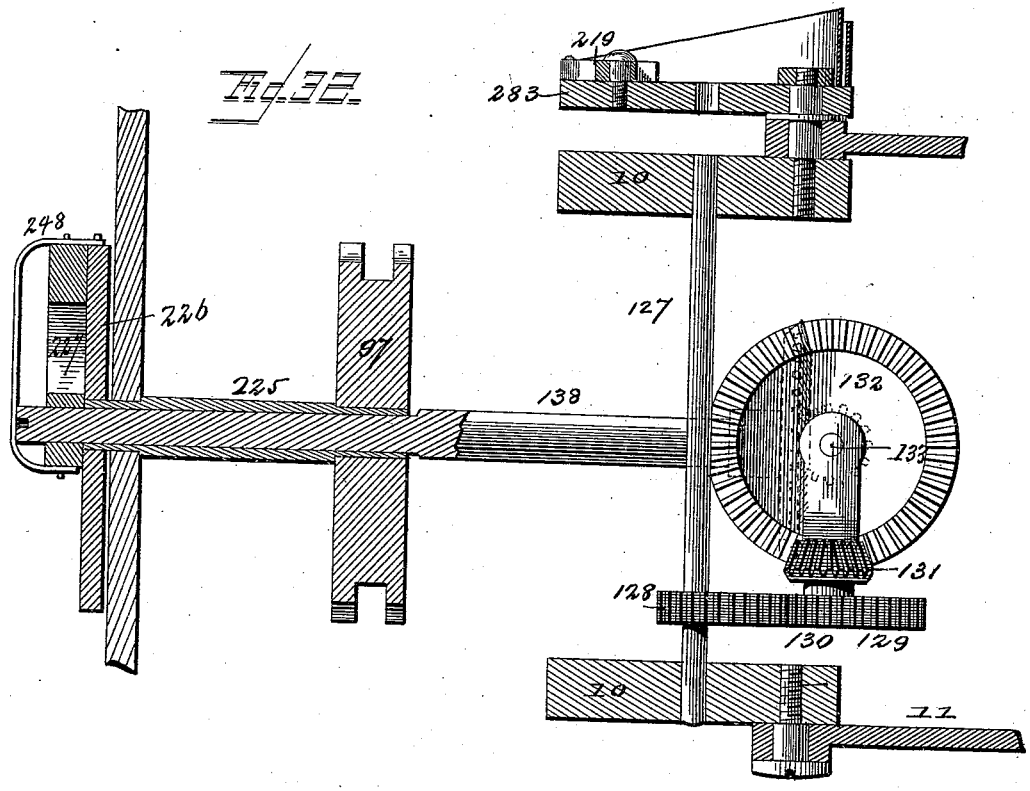
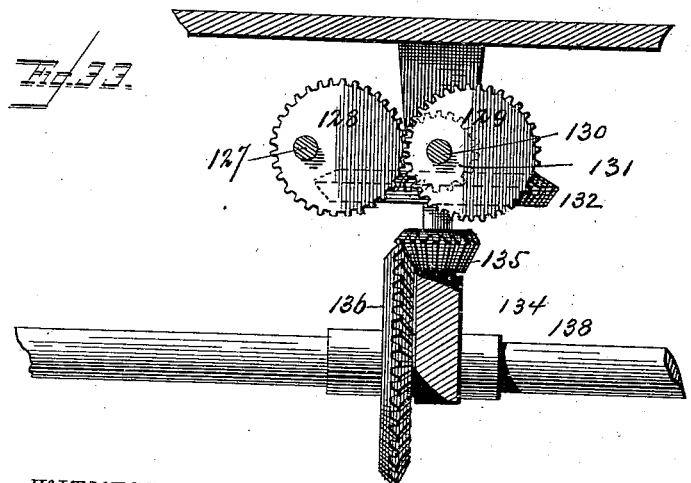
WITNESSES
INVENTOR
Attorneys

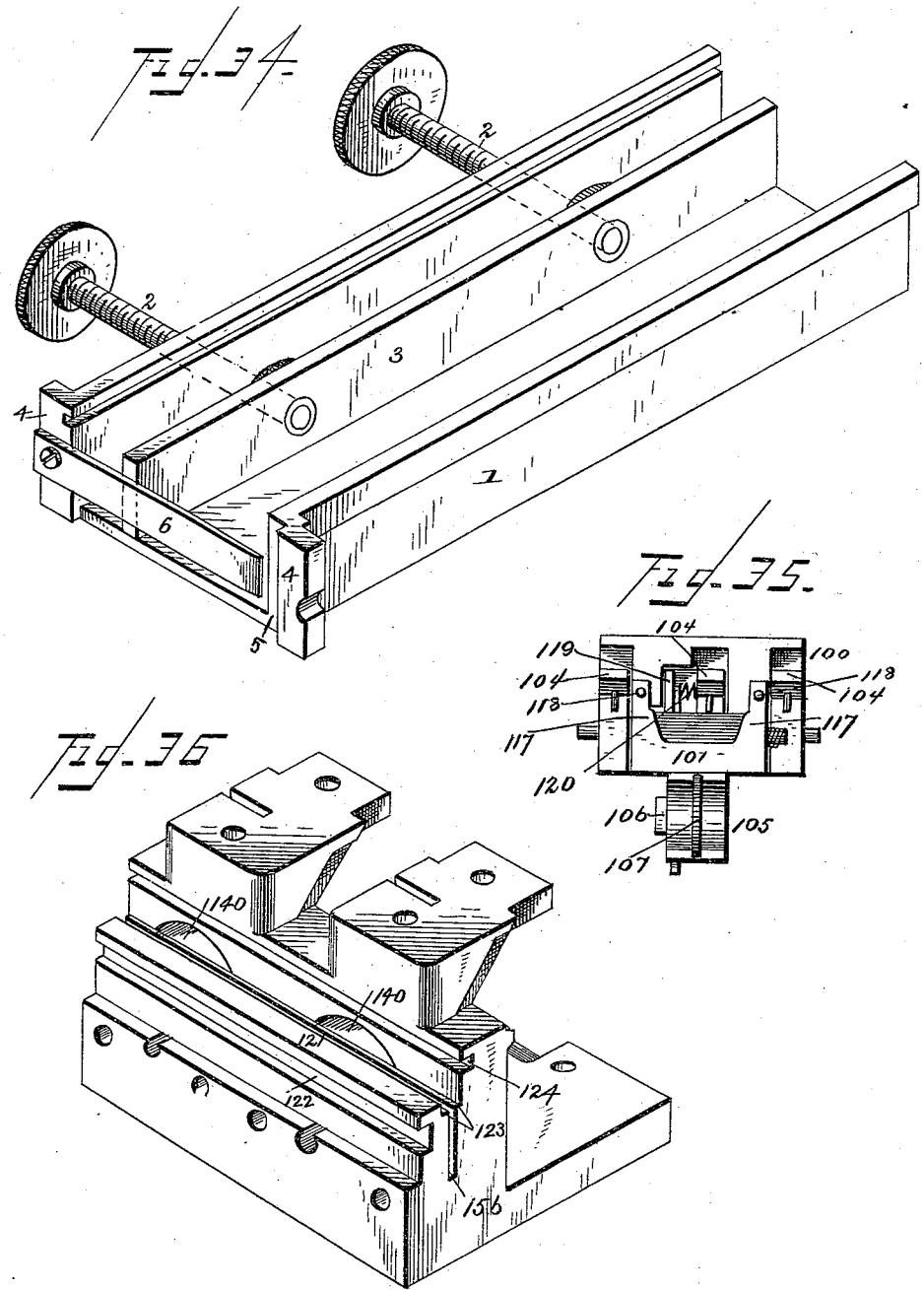

(No Model.)   J. PATTEN.   23 Sheets—Sheet 16.
TYPE DISTRIBUTING MACHINE.

No. 446,235.   Patented Feb. 10, 1891.

WITNESSES
INVENTOR
John Patten
Attorneys

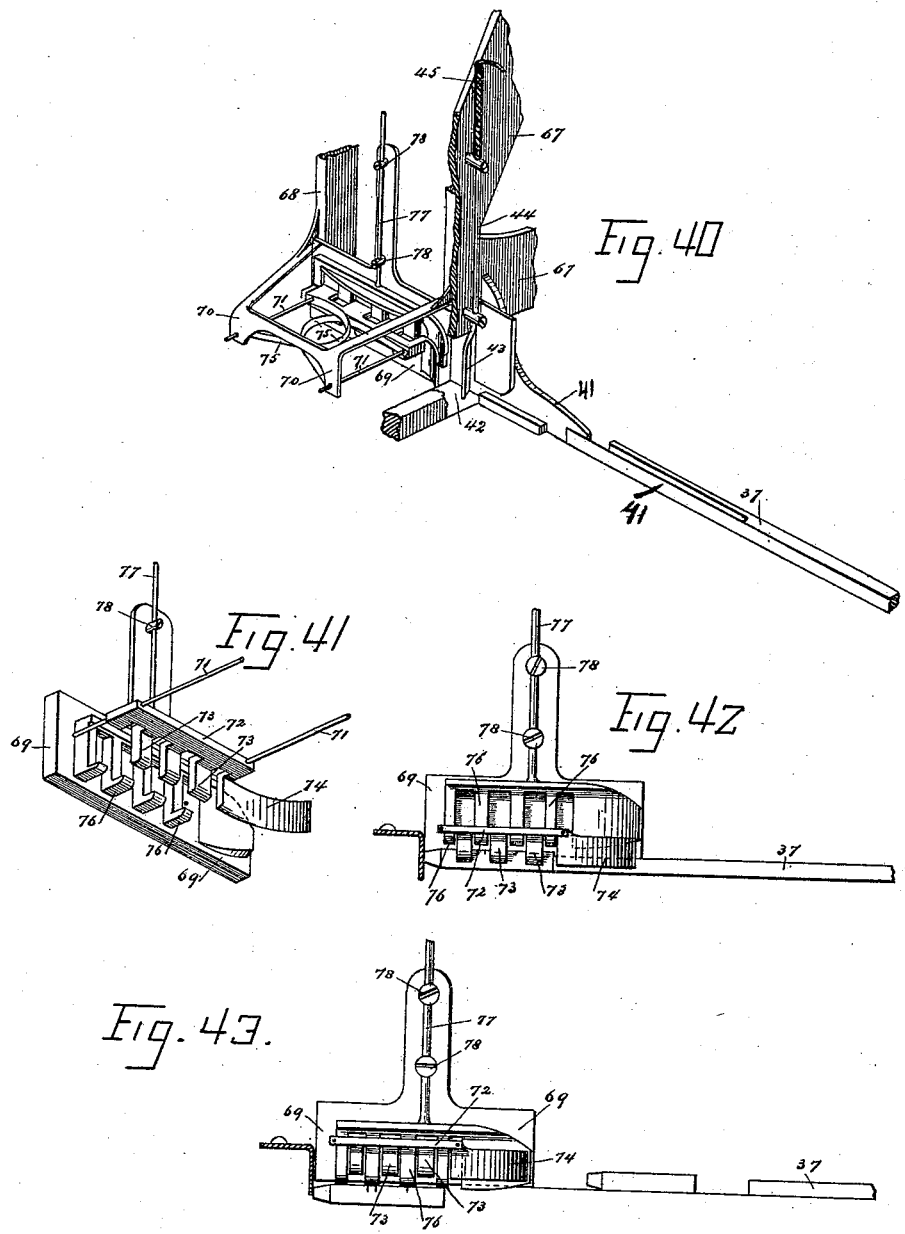

(No Model.)
23 Sheets—Sheet 18.
J. PATTEN.
TYPE DISTRIBUTING MACHINE.
No. 446,235. Patented Feb. 10, 1891.
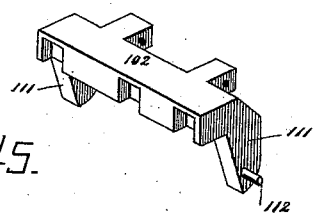
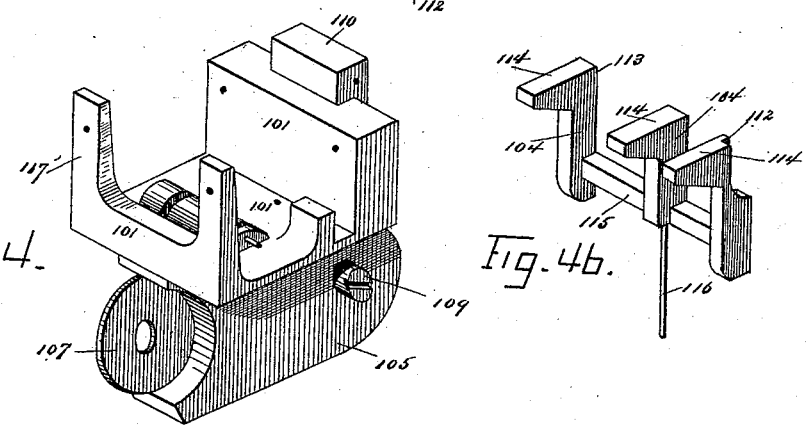
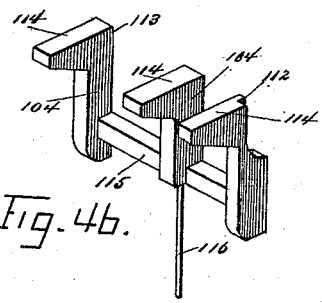
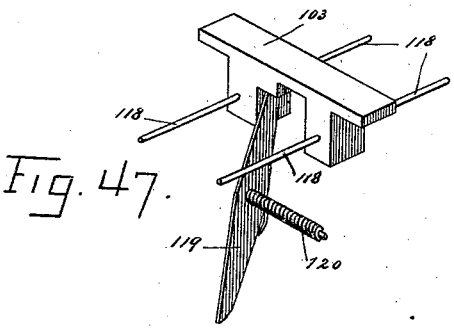
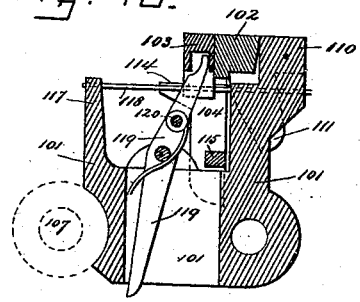

(No Model.)

23 Sheets—Sheet 19.

J. PATTEN.
TYPE DISTRIBUTING MACHINE.

No. 446,235. Patented Feb. 10, 1891.

WITNESSES

INVENTOR (No Model.)

J. PATTEN.
TYPE DISTRIBUTING MACHINE.

No. 446,235.

23 Sheets—Sheet 20.

Patented Feb. 10, 1891.

WITNESSES

INVENTOR

Attorneys (No Model.)

23 Sheets—Sheet 21.

J. PATTEN.
TYPE DISTRIBUTING MACHINE.

No. 446,235.

Patented Feb. 10, 1891.

WITNESSES

INVENTOR (No Model.)
23 Sheets—Sheet 22.
J. PATTEN.
TYPE DISTRIBUTING MACHINE.
No. 446,235.
Patented Feb. 10, 1891.
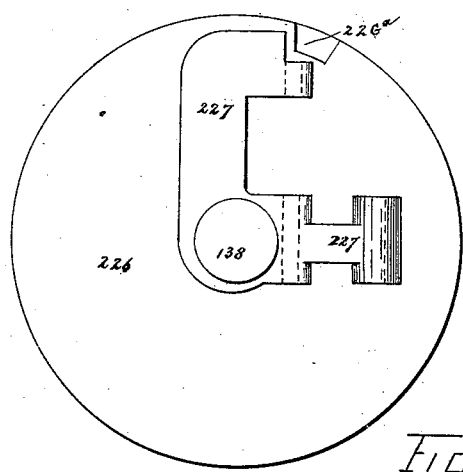
Fig. 54.
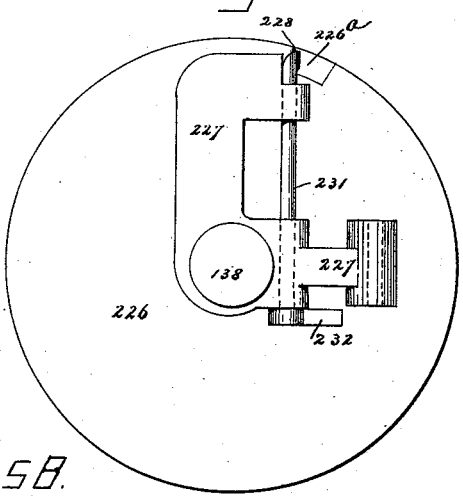
Fig. 55.
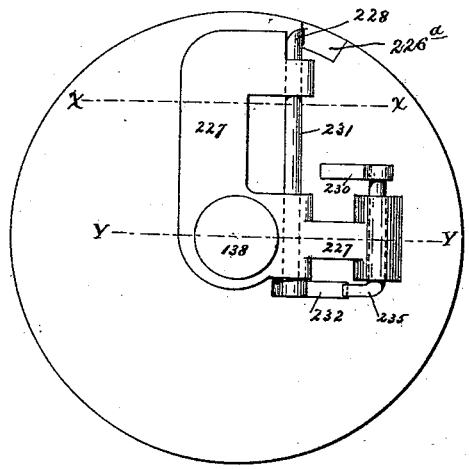
Fig. 56.
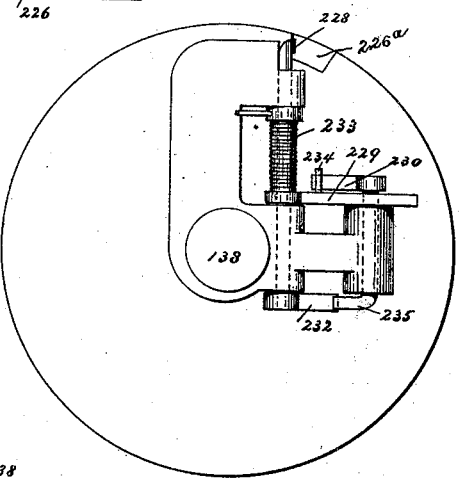
Fig. 57.
Fig. 58.
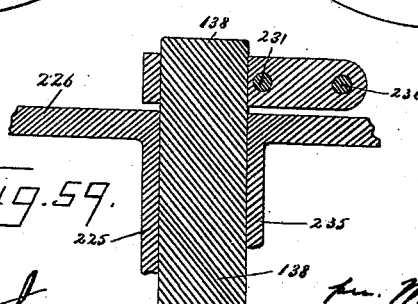
Fig. 59.
WITNESSES
F. W. Johns
James M. Durant
INVENTOR
John Patten
per Murdock & Murdock
Attorneys (No Model.)  23 Sheets—Sheet 23.

J. PATTEN.
TYPE DISTRIBUTING MACHINE.

No. 446,235. Patented Feb. 10, 1891.

WITNESSES

INVENTOR

UNITED STATES PATENT OFFICE.

JOHN PATTEN, OF NEW YORK, N. Y., ASSIGNOR OF ONE-HALF TO EDWARD D. ONION, OF BALTIMORE, MARYLAND.

TYPE-DISTRIBUTING MACHINE.

SPECIFICATION forming part of Letters Patent No. 446,235, dated February 10, 1891.

Application filed June 16, 1888. Serial No. 277,307. (No model.)

*To all whom it may concern:*

Be it known that I, JOHN PATTEN, a citizen of the United States, and a resident of New York, in the county of New York and State of New York, have invented new and useful Improvements in Type-Distributing Machines, of which the following is a full and exact description, reference being had to the accompanying drawings, forming part of the specification.

This invention relates to improvements in type-distributing machines, and more especially to that class in which the type are prepared before being placed therein for distribution.

It consists in a novel construction and combination of the parts, whereby when a column of type is placed in a galley upon the machine they are extracted therefrom in succeeding lines, each line being carried into a carrying mechanism before the next succeeding line is extracted from the said galley, the said lines having exerted upon them while being delivered into the carrying mechanism a lateral pressure, which keeps the type at the one end of the line in position before the gateway through which the separate type are delivered to the carrying mechanism, which receives each type in a distinct chamber, in which it is carried to its separate destination and delivered, and each chamber on being emptied returning to and passing in front of the said gateway to receive another type.

It further consists in a novel construction of a feeding mechanism for extracting the type from the galley and placing them in the carrying mechanism separately, in which is provided a movable plate adapted to be automatically engaged and disengaged with the guiding mechanism of the machine at intervals regulated by the number of type in a line which passes under the said galley; extracting a line of type therefrom at each passage and placing the same in position beside a gateway through which the separate type are delivered; a spring-actuated arm provided with means for engaging the said line and for pressing the same toward the said gateway, so as to interpose each succeeding type at that end in the path of a device for delivering them to the carrying mechanism, and, further, provided with a second arm, the arc of the movement of the end of which extends into the path of a latch upon the plate for extracting the lines of type from the galley, by means of which the said plate is thrown into engagement with the driving mechanism, the said arm being so arranged that this is effected as the last type of any line is delivered into the carrying mechanism, and a device for delivering the separate type successively into the carrying mechanism, abstracting the same from the end of the line next the said gateway, and diminishing the line by one type at each operation.

It further consists in a novel construction and combination of the parts for driving the carrying mechanism, whereby an intermittent movement, timed with the general driving mechanism in such a way as to move the carrying mechanism slowly while the type are being delivered into and extracted therefrom, and rapidly in the intervals between such action, is imparted to the said carrying mechanism, in which is provided an interposed gearing consisting of two meshed eccentric geared wheels, the one connected to the general driving mechanism and the other to the driving-shaft of the carrying mechanism in such a way that the long radius of the one engages the short radius of the other.

It further consists in the novel construction and combination of the parts for transferring the type into the carrying mechanism, in which is provided a swinging frame suspended over the said carrying mechanism adapted to receive the type and retain the same in position in which they are delivered and to expel it into the carrying mechanism, the last motion of which deposits the type in the chambers of the carrying mechanism flush with the upper surface thereof, the said frame being further adapted to move with each chamber of the carrying mechanism while depositing the type therein, thereby allowing for feeding the type to a continuously-moving carrying mechanism and obviating the necessity of providing a stop mechanism for holding the same while the type are being deposited.

It further consists in the construction and combination of the parts of the carrying mechanism where type of varying sizes are received and delivered without alteration in the parts of the machine and without changing the position of the type in the operation of transferring the same, in which are provided separate chambers having jaws adapted to open wide enough to receive any size of type and to grasp the same as they are deposited into the said chambers, and an elevator mounted in the said chamber adapted to raise the said type above the upper surface of the chambers when not resisted.

It further consists in a novel construction and combination of the parts whereby the different denominations of type are raised above the surface of the carrying mechanism for delivery at their separate assigned destinations, in which are provided at intervals over the carrying mechanism plates having in their surface next to the said carrying mechanism projections the edges of which rest within a short distance of the surface of the said carrying mechanism, the projection upon each plate being differently arranged and corresponding to the arrangement of slots formed in some one denomination of type, whereby, as all type having the corresponding arrangements of slots pass under any one of the said plates, they are raised above the surface of the chambers of the carrying mechanism, while all other denominations having a different arrangement of slots are prevented from doing so by the said projections bearing upon the plates between the slots in the same.

It further consists in a novel construction and combination of the parts whereby each type is caused to seek its corresponding plate and to avoid all others, in which are provided in the path of the separate chambers of the said carrying mechanism spring-cams, over which the ends of the elevators into the said chambers which operate to raise the type above the surface of the said chamber pass, the said spring-cams being placed directly in line with the said plates having the projections, thereby causing the thrusting strain by means of which the type are so raised above the surface of the carrying mechanism to be exerted upon each type as it passes under each plate, where, if the projection in the surface of the plate under which it is passing is different from the slots in the type, which prevents the type from rising, the said spring-cams yield to allow the said elevators to pass over them, while if the said projection correspond to the slots in the said type the elevator is raised, and thereby raises the said type, as set forth in the preceding paragraph.

It further consists in the construction and combination of the parts whereby the type when raised above the surface of the carrying mechanism are extracted therefrom without stopping the movement of the same and to a degree preventing friction caused by the contact between the type which are moving with the carrying mechanism in one direction and the edge of the extracting mechanism moving in a different direction, in which are provided between the plates having projections upon the surface next the carrying mechanism planers passing across the said carrying mechanism transversely to the line of movement of and near the surface of the same, the said planers being preferably provided with slightly-flared thrusting ends and attached to a reciprocating mechanism, the said reciprocating mechanism being adapted to impart to the said planers a varying or intermittent movement, consisting in advancing the same rapidly across the said carrying mechanism and returning them slowly, the duration of the double action being so timed with the driving mechanism that a forward movement of the said planers occurs for every advancement of the carrying mechanism the length of the intervals between the centers of the said plates.

It further consists in a novel construction and combination of the parts whereby when the mechanism for thrusting the said type above the surface of the carrying mechanism between the plates, provided with projections hereinbefore described, has been placed in the position necessary to raise the type so that the same will extend into the path of the extracting mechanism, they are replaced in their normal position by the advance of the said extracting mechanism, thus providing for the distribution of any number of succeeding type of the same denomination, in which is provided, attached to the parts of the mechanism for raising the type above the surface of the carrying mechanism, a rod adapted to extend into the path of the said extracting mechanism when the parts are placed in the position herein mentioned in such a way as to be forced to its normal position by the advance of the same, thereby resetting the parts of the said mechanism for raising the type as aforesaid.

It further consists in a novel construction and combination of the parts whereby a breaking or bending strain is prevented from being exerted upon the device for delivering the separate type to the carrying mechanism and upon the device for extracting the successive lines of type from the galley or of any of the parts of the machine contiguous thereto, such as would occur by the insertion of an obstruction in the path of the said devices, in which are provided spring-actuated arms adapted to hold the said delivering and extracting devices in engagement with the driving mechanism of the machine and to ease or release the said devices from such engagement, as the exigencies of the case may demand.

It further consists in a novel construction and combination of the parts whereby more than one type are prevented from being delivered into the carrying mechanism at one time, while allowing different sizes of type to be delivered thereto, in which are provided spring-actuated gates adapted to open to pass all sizes of type from the smallest to the largest and to impinge upon the sides of each while so passing, the one being provided to intercept small type and the other to intercept larger type upon which the first would be ineffectual.

It further consists in a novel construction and combination of the parts whereby the carrying mechanism, when stopped by an obstruction of any kind, is disconnected from the driving mechanism of the machine before a breaking strain is exerted upon any of the parts of the said carrying mechanism or the parts of the machine contiguous thereto, in which is provided a driving-wheel for the said carrying mechanism, which is connected to the driving-shaft of the said mechanism by means of a spring-actuated latch, the strength of the spring thereof being less than the endurance of the said parts of the carrying mechanism or of the parts of the machine contiguous thereto.

It further consists in a novel construction and combination of the parts of the device for delivering the separate type into a mechanism for transferring them to the carrying mechanism, whereby it is prevented from delivering a second type into the same until the preceding one has been so transferred, or when any of the parts of the transferring mechanism have become clogged or otherwise inoperative and are held in front of the gateway through which the separate type are delivered, in which is provided a swinging frame adapted to receive the separate type delivered thereto and to transfer the same into the chambers of the carrying mechanism as they pass under it, a rod having upon the one end a latch adapted to be interposed in the path of the device for delivering the separate type to the said transferring mechanism, and upon the other end with an arm so placed in the path of the same that it is impinged upon and moved thereby, rotating the said rod and placing the said latch in position to engage the device for delivering the separate type, whereby, if any of the parts of the said transferring mechanism become clogged and the same is prevented from returning to its normal position, the said latch engages the said device for delivering the separate type and prevents the same from operating.

It further consists in a novel construction and combination of the parts whereby the device for delivering the separate type to the carrying mechanism is prevented from delivering a second type until the chamber containing the preceding has passed the point of delivery, thus preventing the breaking of the parts of the said chamber or irregularity of the delivery into the same, such as would be caused by the interposition at the point of delivery of two separate type in line, in which are provided two spring-actuated arms provided with shoulders at their meeting ends which bear against each other, the one of the said arms being provided with the latch end adapted to be interposed in the path of the device for delivering the separate type to the carrying mechanism and the other connected to the safety device, whereby the driving-wheel of the carrying mechanism is disengaged from the driving-shaft thereof, so that upon the disengagement of the said wheel from the said shaft the rod is released and the spring is allowed to throw the same over, thereby changing the position of the meeting shoulders on the two rods, so that the latch upon the first rod is interposed in the path of the said delivering devices.

It further consists in a novel construction and combination of the parts whereby the mechanism by means of which the plate for extracting the succeeding lines of type from the galley is prevented from operating when the said galley has become emptied, in which is provided a spring-actuated latch adapted to be interposed in the path of that part of the same which passes the line of type into the path of the device for delivering the separate type to the carrying mechanism when the said part is unaccompanied by a line of type.

It further consists in a novel construction and combination of the parts whereby the driving mechanism, when an obstruction is interposed in the path of any of the parts thereof or they become otherwise inoperative, before a breaking strain is exerted upon any of them, in which is provided a spring-actuated connection between the driving-shaft of the feed mechanism and the driving mechanism of the machine, the tension of the spring being less than the breaking strain of any of the said parts, thus allows the driving mechanism to become disconnected before the said strain is reached.

It further consists in a novel construction and combination of the parts whereby the motor is automatically disconnected from the machine before a breaking strain is exerted upon any of the parts thereof, and the said motor is allowed to rotate independently of the machine until the obstruction is removed, when it is automatically engaged, in which is provided upon the driving-shaft of the machine a movable column and a shoulder forming a clutch, the said part being held in engagement by means of a spring the tension of which is less than the breaking strain of any of the parts immediately connected therewith.

In the drawings, a section of the machine only is shown, as the parts are duplicated beyond the line of breakage, with the exception of the feed mechanism, making it useless to illustrate the complete machine at the expense of rendering the parts too small.

Figure 37:
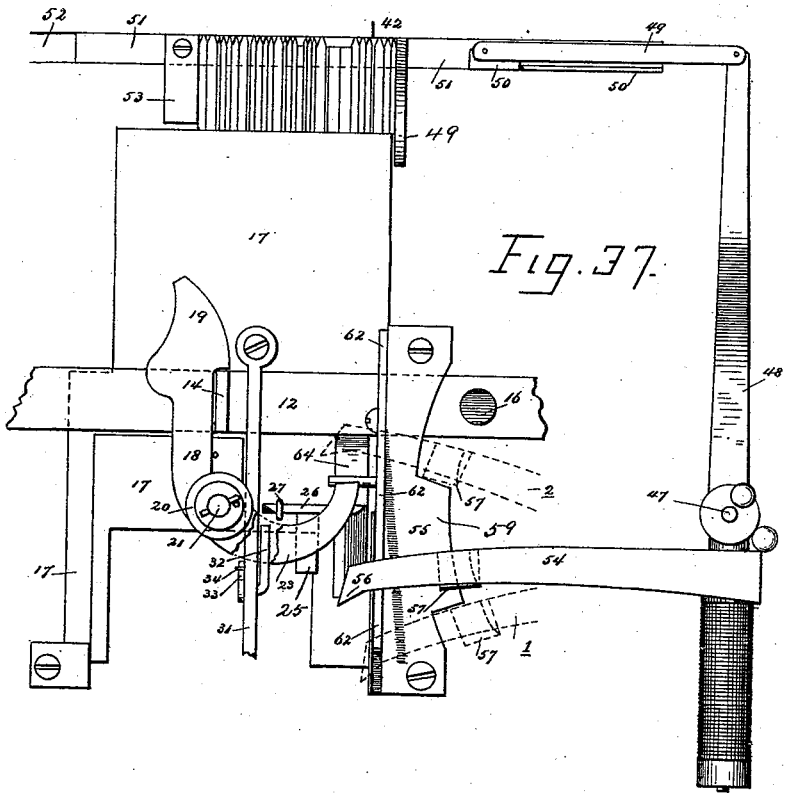
Figure 38:
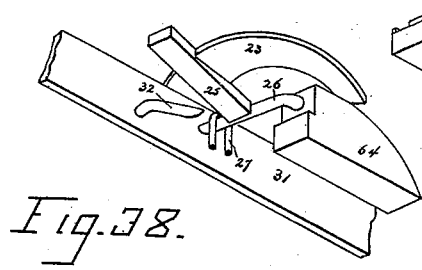
Figure 39:
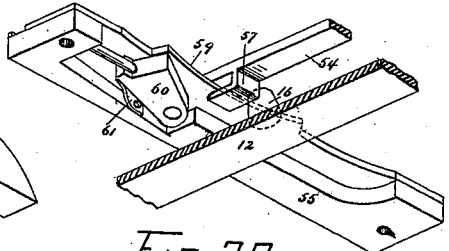
Figure 49:
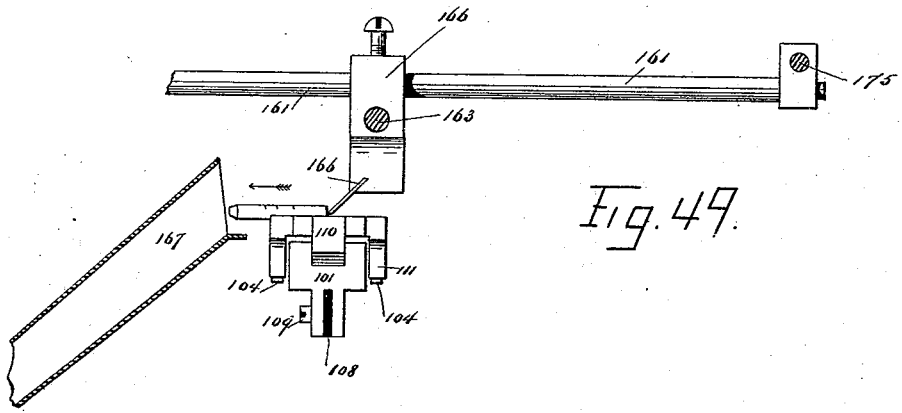
Figure 50:
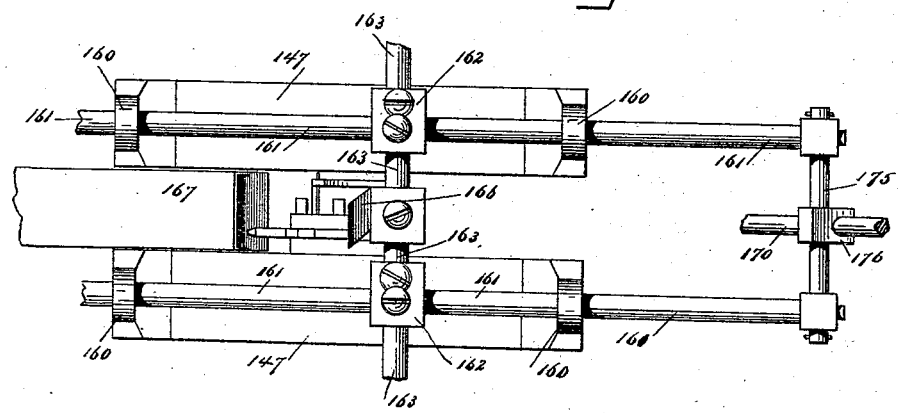
Figure 51:
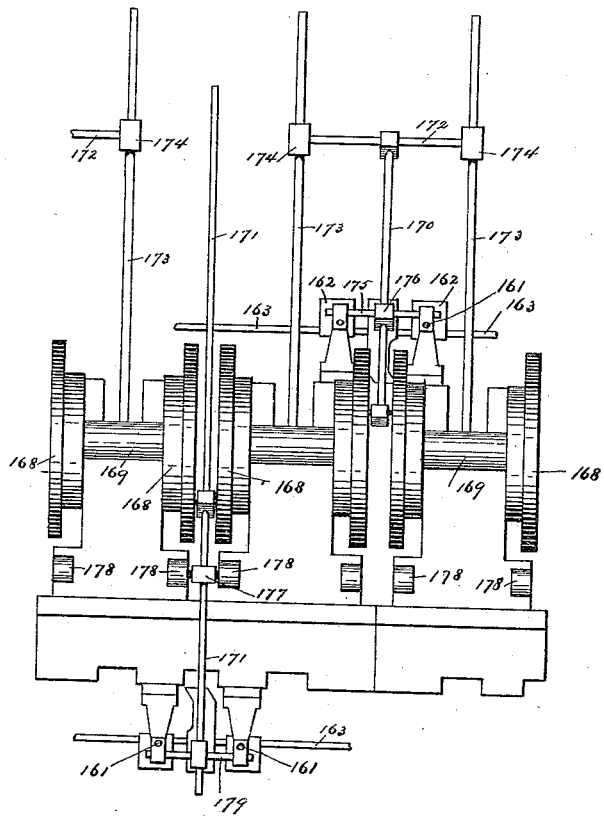
Figure 52:
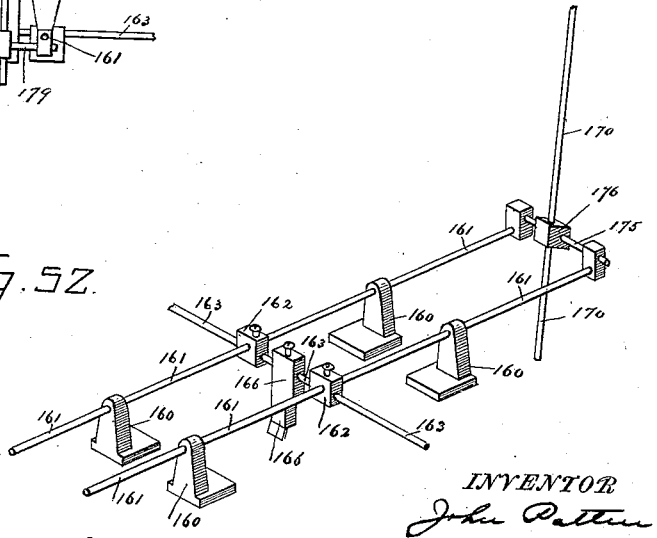
Figure 53:
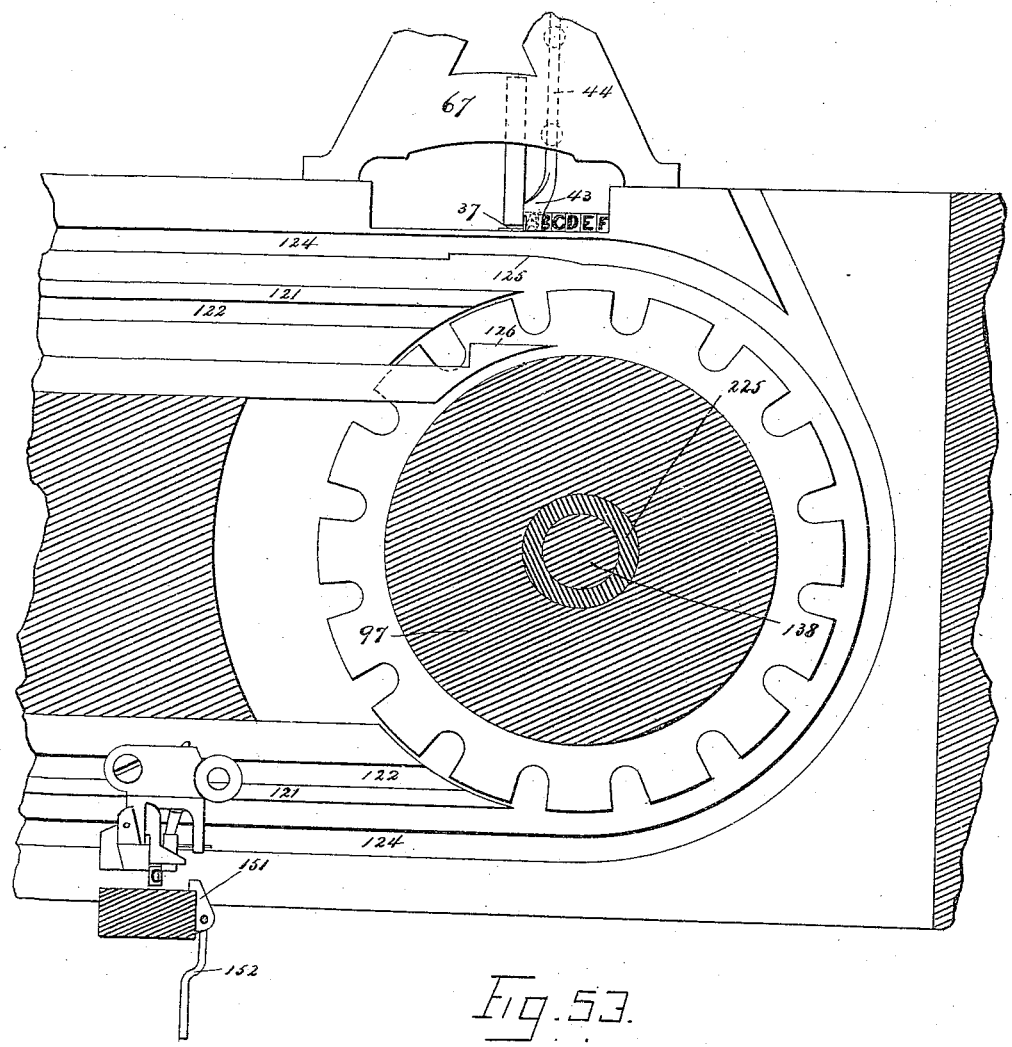
Figure 60:
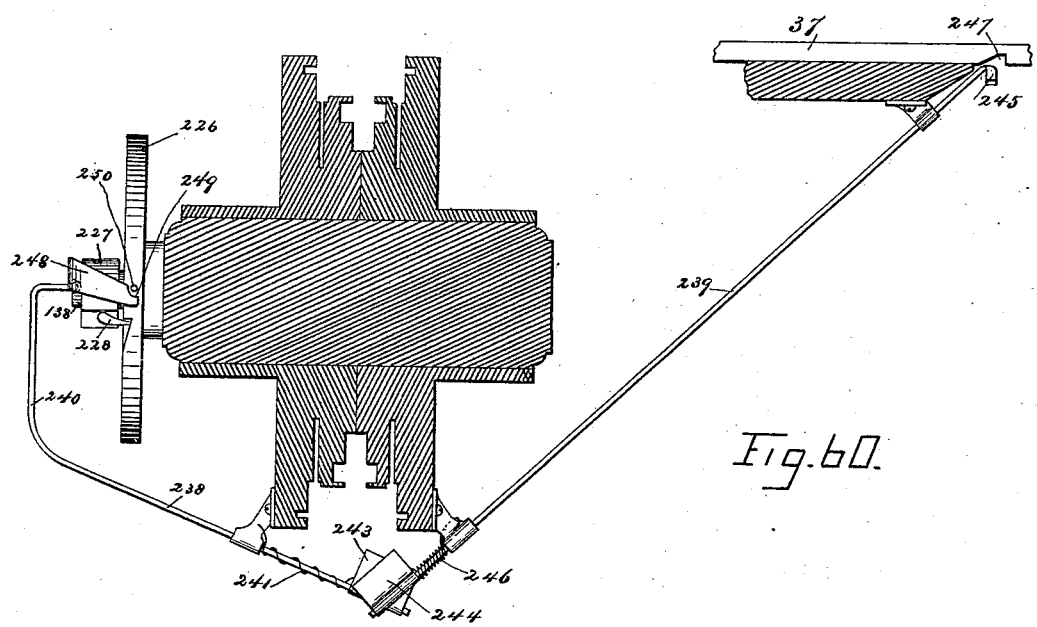

Figure 1 is a side elevation looking at the front of the galley for holding the column of type and the end of the feed-table. In this view is shown one style of motor and the means whereby the motion is transmitted.

therefrom to the mechanism for extracting the type from the carrying-chain. Fig. 2 is a side elevation of the machine opposite that shown in Fig. 1. In this view is shown the device for disconnecting the driving-wheel of the carrying-chain from the driving-shaft of the same, the tranferring mechanism and the means for communicating the thrusting motions thereto, and the channels into which the type are expelled when extracted from the carrying-chain. Fig. 3 is a plan view of the machine as shown in Figs. 1 and 2. In this view is shown the channel in which the carrying-chain moves, the said chain being for convenience omitted. Fig. 4 is an end elevation of the machine. In this view is shown the side elevation of the feed-table, the front elevation of the transferring mechanism, and a locking device for retaining the machine in its horizontal position. Fig. 5 is a longitudinal section of the machine, being broken in the center to show the idler-wheel over which the chain travels at the end of the machine. (Not shown in the other view.) In this view is shown in elevation the endless carrying-chain, one link of which is in the act of receiving a type from the transferring mechanism. Fig. 6 is a cross-section of the machine. In this view is shown in elevation the mechanism for imparting to the planer which extracts the type from the carrying-chain an intermittent movement hereinafter described, the disposition of the spring-buffers, the tripping-trigger, the barrel-springs, and the form of the chutes into which the type are expelled. The carrying-chain in this view is omitted. Fig. 7 is an enlarged view of the upper section of Fig. 6. In this view is shown a single link of the carrying-chain and a slotted type engaged therein, the elevation of the combination-plates having a runner or projection on the surface next the carrying-chain out of alignment with the slots in the type, and showing the disposition of the barrel-springs and the other parts of the mechanism for raising the type above the surface of the link under these conditions. Fig. 8 is a detail view in perspective of the combination-plates and of the means whereby the type are raised above the carrying-chain, the same being in their normal positions. Fig. 9 is a side elevation of the same, showing in dotted lines the position which the said parts assume when tripped so as to raise the type. Fig. 10 is a cross-section of the combination-plates, showing the trigger for tripping the mechanism for raising the type in its relation to the rod for resetting the same. Figs. 11, 12, and 13 are respectively the top view, the bottom view, and the side view of the link of which the carrying-chain is composed. In Fig. 13 are shown the jaws opening in position to receive a type. Figs. 14, 15, and 16 are views in detail of the transferring mechanism, showing, respectively, a longitudinal section, a front elevation of the same, and a bottom view of the grasping-jaw and thrusting-feet. In the first of these is shown the means for transmitting the thrusting motion to the thrusting-feet, and the relation between the swinging frame and the safety device for preventing the action of the feed mechanism in the event of breakage or clogging of any of the parts of the said frame. In the second is shown the disposition of the grasping-jaw with relation to the thrusting-feet and the gage-plate for regulating the position of the type when fed into the said frame. In the third is shown the form of the teeth of the grasping-jaw, the thrusting-feet, and the flared guide for leading the type into the said jaw. Fig. 17 is a detail view of the transferring mechanism and a single link of the carrying-chain in position to receive a type from the said mechanism. In this view the thrusting-feet have received one downward motion, protruding the type slightly below the back of the swinging frame, the pivoted jaw of the link has been tilted, so as to impinge upon the said type, and the grasping-jaw has been thrown back to its full extent to allow of the admission of the same, the end of the lever, by means of which it is opened, being near the edge of the steel block which is interposed into its path. The arrow indicates the direction in which the said link is moving. Fig. 18 is a detail view of the mechanism by means of which the graduating impacts are imparted to the thrusting-feet of the transferring mechanism. In this view is shown the disposition of the pins upon the driving-wheel of the feed mechanism with relation to the bent portion of the shaft for transmitting the motion and the plan of mounting the divided rod for so transmitting it. Fig. 19 is a plan view in detail of the feed-table, in which the latch for connecting the feed-plate for extracting the succeeding lines from the galley and the bar for guiding the finger for actuating the said latch are removed. In this view is shown the means for attaching the feed-bar to the cross-bar, the parts being separated for convenience of illustration, the latch by means of which the latch for engaging the feed-plate with the said cross-bar is attached, the feed-plate, and the latch for preventing the said cross-bar from advancing in the event of an accident to the transferring mechanism. Fig. 20 is a detail view in perspective of the bar for guiding the finger which actuates the latch connecting the feed-plate to the cross-bar, which is omitted in Fig. 19. Fig. 21 is a side elevation of the same, showing in dotted lines the cam by means of which the rod for raising the finger for actuating the latch connecting the feed-plate to the cross-bar is raised out of engagement with the latch and shoulder at the rear of the said bar. Fig. 22 is a detail view in perspective of the latch by means of which the feed-plate is engaged to the cross-bar, as aforesaid. In this view is shown the safety attachment, by means of which the feed-plate and cross-bar are disengaged before a breaking-strain has been exerted upon the feed-plate or the parts contiguous thereto. Fig. 22ª is a vertical sectional view of the pivot-collars and springs of the latch and arm. Fig. 23 is a detail view in perspective of the gateway through which the separate type are delivered in the transferring mechanism. In this view is shown the gate by means of which more than one type are prevented from passing into the said transferring mechanism at the same time, the end of the feed-bar for delivering the separate type through the said gateway, the foot for guiding the same and forming the side wall of the feed-plate, and a presser-foot by means of which the line of type is pressed against the said side wall. Fig. 24 is a detail view in perspective showing the apron-guide under which a line of type is passed into the feedway, the steel plate the end of which protrudes into the gateway, (omitted in Fig. 23,) and the spring for retaining the same in position. In this view the presser-foot is omitted. Figs. 25 and 26 are detail views of the device by means of which the presser-foot is prevented from oscillating back and forth when the type in the galley have been exhausted, being respectively front and side elevations. Fig. 27 is a detail view in perspective of the safety attachment by means of which the cross-bar is prevented from advancing in the event of an accident to the transferring mechanism. The dotted lines in this view represent parts of the latch which are necessarily concealed, and the bar against which the ends of the large spring rest, the ends only of the said spring being shown. Fig. 28 is a detail sectional view of the end of the channel in which the carrying-chain moves, the view being taken next the feed-table. In this view is shown the section on the driving-wheel of the carrying-chain, a continuation of the slots in the side of the said channel, the cams over which the pins in the sides of the pivoted jaw of the links of the carrying-chain pass before reaching the transferring mechanism, the steel block which is interposed in the path of the end of the lever for opening the grasping-jaw of the links, and a front elevation of the gage for the admission of the type to the transferring mechanism. Fig. 29 is a detail view in elevation of the safety attachment for disconnecting the driving-wheel of the carrying-chain from the driving-shaft thereof, and of the means for releasing the rods for interposing the latch in the path of the feed-bar. In this view the parts are shown disengaged, and are in the position in which they would be immediately after the chain has stopped. Figs. 30 and 31 are detail views in elevation of the clutch by means of which the driving-shaft of the general mechanism is connected to the feed mechanism. Figs. 32 and 33 are detail views whereby the intermittent movement, hereinafter described, is transmitted from the driving mechanism of the feed mechanism to the driving-shaft of the carrying-chain, the views being, respectively, plan and side elevation. In the first of these views is shown the manner in which the driving-wheel of the carrying-chain is mounted upon the shaft, and in the second is shown the shape of the intergear eccentric cog-wheels. Fig. 34 is a perspective view of the galley. In this view is shown the spacing-bar by means of which the galley is made to fit the columns of type and flexible finger to prevent the jamming of the type while being extracted. Fig. 35 is an end view of the link composing the chain. Fig. 36 is a perspective view of one of the sections composing the distributing-channel. Fig. 37 is a detail view in plan of the parts for advancing the lines of type to be separated, with the mechanism for connecting and disconnecting the feed-plate and cross-bar of the driving mechanism. In this view the finger 54 is shown in three positions, that indicated in full lines showing its position when the line of type has been fully advanced and as raised by the lifting-rod 62, that indicated in dotted lines at 2 showing its position as the last type in every line is separated, and that indicated in dotted lines at 1 showing its position immediately after setting the latch 23. Fig. 38 is a detail view in perspective of the latch 23, showing how it is engaged and held in position by the latch 26, and the positions of the said latch 26 and latch 32. Fig. 39 is a detail view in perspective of the bar 55, and also sections of the finger 54 and cross-bar 12, showing the engagement of the hook 57 and lug 16. Fig. 40 is a detail view in perspective of the transferring mechanism and gate through which the type are advanced. Fig. 41 is a detail view in perspective of the operative parts of the transferring mechanism disconnected to show the construction of each. Fig. 42 is a front elevation of the parts shown in Fig. 41 in position. In this view is shown a type thrust forward by the feed-bar and a gage for regulating its advance. Fig. 43 is a front elevation of the same, showing the position of the parts as the type is expelled from the transferring mechanism. Fig. 44 is a detail view in perspective of the body of the links of the carrying mechanism. Figs. 45, 46, and 47 are detail views in perspective of the pivoted jaw, the elevator, and clamping-jaw, respectively, of the links composing the carrying mechanism. Fig. 48 is a longitudinal section of one of the said links with the parts in position. Fig. 49 is a detail view in elevation of one of the planers of the extracting mechanism, showing a type half expelled from a link of the carrying mechanism. Fig. 50 is a plan view of the same, showing the mounting of the said planers. Fig. 51 is a front elevation of a section of the machine, showing the connections for imparting movement to the said planers. Fig. 52 is a detail view in perspective of the mounting and connections of the said planers. Fig. 53 is a detail view in section of the end of the channel in which the carrying-chain moves, looking toward the opposite side from that shown in Fig. 28. In this view is shown another view of the gate through which the type are advanced, and a view of the last combination-plate, where all type that may have failed to be distributed are extracted. Figs. 54, 55, 56, and 57 are detail views in elevation, showing the parts as they are placed in position in their order, of the safety-device for disconnecting the driving and carrying mechanisms. Fig. 58 is an end elevation showing its engagement with the wheel on which it is mounted. Fig. 59 is a detail view in section, showing the end of the driving-shaft of the driving mechanism, the sleeve on which the driving-wheel of the carrying mechanism is mounted, and the wheel and safety device shown in Fig. 57. Fig. 60 is a detail view showing in elevation the safety device by means of which the feed of the type is prevented when the carrying-chain has stopped.

The reference-figure 1 designates the galley for holding a section of a column of type, the sides of which are provided with slots, in which is mounted a glass plate forming the front of the said channel and leaving a space between it and the back of galley slightly more than the length of the type in ordinary use. In the sides of the channel are threaded perforations. Mounted in the said perforations are the screws 2, provided with knobs for operating the same. Pivotally mounted upon the end of the said screws inside the said channel and actuated thereby is the spacing-plate 3. The sides of the said galley extend slightly beyond the lower edge of the back of the same to form the feet 4. The foot opposite the said spacing-plate is provided next to the said channel with a groove 5, adapted to pass the feed-bar of the feeding mechanism and with the semicircular groove in the outer edge adapted to fit the shank of the screw-lock 7. Mounted upon the under face of the other foot is the finger 6, extending across the bottom of the said channel, leaving a space between its upper surface and the lower edge of the back of the said galley large enough to pass a single line of type.

The galley herein shown is large enough to accommodate a half-column of type of varying widths. To load the said galley the type are emptied from the said column into the said channel without disturbing the arrangement of the same. When the type are then placed in the galley, the space-bar 3 is moved forward by means of the screw 2 until it rests lightly against the said type. The glass front is then placed in the slots of the said galley, at the same time allowing the operator to observe the condition of the type in the said galley. The said galley is mounted upon the feed-table, the finger 6 extending down in a slot 8 cut in the surface of the said table to receive it. When thus placed in position, the top of the said feed-table and top of the said finger are flush, and one foot of the said galley extends under the screw-lock 7. The said screw-lock is mounted in a threaded perforation in the said table, and is provided with flat shoulder which extends over the slotted foot 4 when the handle 9 of the said clamp is turned toward the said channel. As the shoulder is brought over the foot 4, the threads of the said lock draw it down upon the said foot, locking the galley firmly in position.

Upon either side of the said feed-table are mounted the drive-wheels 10 10, to which are attached the pitmen 11 11, which are of equal length and mounted in corresponding positions upon the said wheels and are attached to either end of the cross-bar 12. The said cross-bar extends across the feed-table and is mounted in the guides 13 13 at the sides of the said table and is provided with the lug 14, the swivel 15, and the lug 16. Under the said cross-bar and resting upon the surface of the said feed-table is the feed-plate 17. The said plate is adapted to pass under the entire width of the galley 1 above the finger 6 and is propelled backward and forward by the said cross-bar 12, to which it is connected by means of the latch 18, engaging the lug 14, Figs. 19, 22, and 37. The said latch is provided with the head 19 and is mounted on the perpendicular rod 21 with an elongated sleeve $20^a$ extending nearly to the top of the rod and provided with a collar 20, which is connected to the sleeve by a spring 22, the tendency of which is to disengage the said latch from the lug 14 by throwing the same out of the path of the said lug. Mounted upon the first-mentioned sleeve below the collar 20 is a second sleeve $20^b$, to which is attached the curved finger 23 and which is attached to the collar 20 by means of the coiled spring 24. The said spring 24 is adapted to overcome the spring 22 when the said curved finger is moved, and thereby moves the latch 18 in position, the spring 22 acting only when the spring 24 is passive. Upon the under side of the curved finger 23 is a bevel steel stop 25. Resting under and against the said steel stop and mounted in the said feed-plate 17 is a small spring-actuated latch 26, the free end of which moves in a guide 27. The said latch is depressed by the stop 25, when the said finger 23 is thrown back and interposes itself in front of the said stop to prevent the said finger from resuming its normal position immediately the same has passed over it. When the said finger 23 is moved back, the head 19 of the latch 18 is forced in front of the lug 14, which is at its extreme backward movement. In this position the feed-plate is carried forward by the said cross-bar 12, passing under the said feed-channel and above the finger 6, forcing before it the line of type which is at the bottom of the galley and resting upon the said finger. The said line of type is carried to the extreme of the forward movement of the said feed-plate, which deposits it under the apron-guide 28 and against the rear wall of the feedway 29 behind the same. The apron-guide 28 is pivotally mounted at the rear of the said feedway and is provided in the front with the bevel-face, whereby when the said line of type is pushed forward by the said feed-plate the said apron-guide mounts over the said type and the said feed-plate, where it remains until the said feed-plate is withdrawn, when it falls, the shoulder 30 passing behind the said type. The finger 23 passes over a bar 31, which is rigidly attached to the table. Pivotally mounted in and passing through the said bar and in front of the said finger is the latch 32. The said latch extends up in the path of the latch 26 and acts to depress the same in the backward movement of the feed-plate 17. The said latch 32 is provided upon the opposite side of the bar with the small finger 33, upon which a spring bears and forces it against the stop-pin 34 and raises the end of the said latch above the path of the latch 26. In the forward movement of the plate 17 the free end of the latch 26 strikes above the pivot of the said latch 32 and depresses the same in passing over it when it resumes its normal position. When the said feed-plate returns upon the backward movement, the end of the said latch 32 extends above the path of the said latch 26, catches the free end of the same, and, being held firmly in position by means of the stop-pin 34, forces the said latch beneath it. In doing so the said latch 26 is disengaged from the bevel-stop 25 upon the finger 23. When this is done, the coil-spring 22 forces the latch 18 out of engagement with the lug 14, permitting the cross-bar 12 to operate independently of the said feed-bar. At the bottom of the swivel 15 upon the said cross-bar 12 is provided the finger 35, which is forced against the rear side of the said cross-bar by means of the coiled spring 36, Fig. 4. The said finger extends over the channel in which the feed-bar 37 operates.

Upon the upper surface of the feed-bar and extending to the top of the cross-bar 12 is the pin 38. To attach the said feed-bar to the cross-bar 12 the finger 35 is revolved upon the swivel 15 by means of the handle 39 upon the same until the said finger is to one side of the said feed-bar. The feed-bar 37 is then moved forward until the pin 38 upon the same rests against the said cross-bar. The handle 39 is then released and the finger 35 allowed to pass over the said feed-bar and behind the said pin, pressing it against the said cross-bar and retaining it there by the tension of the coiled spring 36. In the forward end of the said feed-bar is formed the channel 40, substantially as shown, leaving upon the side next to the feedway 29 a narrow strip of metal. In the said channel is set a stationary foot 41, which acts as a guide to the said feed-bar and forms the side wall of the feedway 29, against which the type are continually pressed. The rear wall of the feedway 29 is cut away to form the gateway large enough to accommodate the largest type ordinarily used. Interposed in front of the said gateway is the gate 43. The said gate is provided with the perpendicular rod 44, by which it is pivotally mounted in bearings upon the face of the frame of the transferring mechanism. Coiled upon this perpendicular rod and so acting as to keep the gate closed in front of the said gateway is a small spring 45. The said gate is set back slightly from the said rod, whereby in opening it turns upon the said rod as a center opening across the entire width of the galley.

Extending from the side of the feed-table is the bracket 45ª, mounted upon the end of which is the perpendicular rod 47. Pivotally mounted upon the said rod is the arm 48. The forward half of the said arm is bent up, substantially as shown, to pass over the driving-wheel 10, and is connected at the forward end with the pitman 49. The said pitman is pivotally connected to the bracket 50, mounted on the top of the feed-arm 51. The said feed-arm is mounted in the slot 52 cut in the feedway, and is provided with the flanges extending under the edges of the said slot which act as guides for the same. The upper surface of the said feed-arm is flush with the upper surface of the feedway. At the end of the said feed-arm is the presser-foot 53, which is adapted to impinge upon the said type which have been delivered into the said feedway and to pass under the apron-guide 28. Upon the lower half of the said arm 48 is pivotally connected the finger 54. The said finger is extended upward, so as to pass above the bar 55, which is secured rigidly upon the feed-table, and beneath which the cross-bar 12 operates. The said finger is provided at the end with the steel shoe 56, which is placed so as to impinge upon the finger 23 in passing. Upon the under side of the said finger is a depending hook 57, Figs. 1, 37, and 39, formed with a square shoulder on the forward side and with a rounded bevel at the rear, and adapted to extend under the said bar 55. The said bar 55, as hereinbefore stated, is rigidly secured to the feed-table and is provided with the rounded recess in the flange 59, which is nearly as wide as the under part of the said hook, extending to the extreme of the backward movement of the cross-bar 12. The edge of the said flange is cut to a curve struck from the perpendicular rod 47, whereby when the said finger is moved about this center the hook 57 will not come in contact with the said edge. At the rear of the said flange is formed an abrupt shoulder, which allows the said hook to be raised to the top of the said flange. Pivotally attached to the under face of the said flange is the latch 60. The said latch is provided with a beveled surface extending into the path of the hook 57, and forming to the rear a square shoulder which comes directly beneath and corresponds to the abrupt shoulder at the rear of the flange 59. The said latch is held in position by the spring 61, which allows the hook 57 to pass and immediately thrusts the said latch to the rear of the same preventing its backward movement. Pivotally mounted upon the side of the said bar 55 opposite that bearing the flange 59 is the lifting-rod 62. Extending from the side of the said rod is the pin 63, which is placed forward of the pivotal bearing and rests in the path of the cam 64 upon the feed-plate 17, which in the forward movement of the said feed-plate passes under the said pin, lifting it to its upper surface. By this action the end of the said rod 62 which rests under the end of the finger 54 is raised far enough to lift the said finger with the said hook clear of the latch 60 and of the rear shoulder of the flange 59. When the said finger is thus raised out of contact with the said latch and rear shoulder of the said flange, the coiled spring 65 upon the perpendicular rod 47 thrusts the arm 48 back to its normal position and the finger 54 back until the hook 57 rests in the recess 58. When the said hook is in this position, the lug 16 upon the cross-bar 12 engages the square shoulder of the said hook in its rearward movement and forces it under the said flange 59 to the end thereof and past the latch 60. By this means the finger 54 is forced back, causing the steel shoe 56, Figs. 3 and 37, to impinge upon and move the curved finger 23 back in passing. In this position of the finger 23 the latch 18 is engaged with the lug 14 on the cross-bar 12, thereby coupling the feed-plate 17 so as to be carried forward by the said cross-bar. When the said curved finger is thus thrown back of the cross-bar 12, it is retained by the spring-latch 26 before mentioned. In this position of the parts just mentioned the arm 48 has turned upon the perpendicular rod 47 carrying the presser-foot 53 of the feed-arm 51 to the farthest extreme of the feedway 29. As hereinbefore stated, when the latch 18 is thus locked upon the lug 14 the feed-plate 17 is carried forward by means of the cross-bar 12, and a line of type is extracted from the galley 1 and carried forward under the apron-guide 28 into the feedway 29. When the line of type are thus in position in the feedway, the cam 64 upon the feed-plate reaches and passes under the pin 63 of the lifting-rod 62, raising the end resting under the finger 54 and raising the said finger out of contact with the latch 60 and the flange 59. The coiled spring 65 upon the perpendicular rod 47 thrusts the arm 48 toward its normal position until the presser-foot 53 at the rear of the said line of type comes in contact with the same. The force of the said spring is then exerted to press the said type against the sides of the said feedway next the gate-way 42. As the said line of type is distributed by the feed-bar 37 through the said gateway 42 the said presser-foot approaches the side wall of the said feedway next the gateway. As it does so the spring 65, acting upon the arm 48, carrying the finger 54, forces the said arm gradually to its normal position, when the hook 57 of the said finger falls into the recess 58. This occurs as the last type of the said line is distributed, allowing the presser-foot to rest against the side wall of the said feedway, and the cross-bar 12 is at its extreme forward motion. As the said cross-bar returns the lug 16 comes in contact with the said shoulder of the said hook, when the operation is repeated, as hereinbefore described. During the operation above described the feed-bar 37 is operated back and forth with the cross-bar 12 at each revolution of the driving-wheels 10, the thin piece of metal of the said feed-bar next to the line of type catching at each forward thrust of one of the said type, and passing the same through the said gateway the gate 43 opens far enough to pass but the one type, the tension of the spring 45 preventing more than one passing at the same time. Pivotally mounted in the frame 67 is the transferring mechanism 68. At the bottom of the said mechanism and mounted rigidly thereto is the steel back 69. Extending through perforations in the back 69, to and through perforations in the arms 70, which extend in front of the said back, are small guide-rods 71. Mounted rigidly upon the said guide-rods is the clamping-jaw 72. The said jaw is provided with the teeth 73, fitting flush to the said back 69, and extending to nearly the lower edge of the same. At the end of the said jaw next the gateway is the flared guide 74. Interposed between the ends of the said arms 70 and the said jaw are two small springs 75, which tend to keep the said jaw closed upon the said back. The flared guide 74 acts to guide the type when they are being forced into the said carriage between the said jaw and the said back, and the gage 69$^a$ serves to limit the forward movement of the same. Passing between the teeth of the said jaw are the thrusting-feet 76. The said thrusting-feet are connected at the top above the said jaw and are provided with the perpendicular rod 77, which is mounted in guides 78 upon the back 69. To the end of the said rod is attached the pitman 79, passing down behind the said back and connected to the bell-crank 80. The said bell-crank is mounted in a bracket-bearing 81, extending out from the said back 69. To the other end of the said bell-crank is connected the pitman 82, the other end of which is attached to the crank-arm 83 of the shaft 84. The said shaft is mounted in the carriage-frame 67, extending across the same and provided on the outer side thereof with the crank 85. To the said crank-arm is pivotally attached the pitman 86, which connects the same with the crank-arm 87 of the shaft 88 at the end of the machine. The said shaft 88 is mounted in bearings upon either side of the distributing-channel, and is provided with a coiled spring, which tends to throw the crank-arm 87 toward the transferring mechanism. The end of the said shaft 88 next to the drive-wheel 10 is bent so as to rest against the periphery of the said wheel extending obliquely across the same. Mounted upon the periphery of the said wheel are the pins 90, 91, and 92. The said pins are mounted at intervals around and across the periphery, the first and second separated by a small interval obliquely from the inner edge of the said wheel, and the third is separated from the second by a greater interval in approximately the same line. The second pin 91, being placed slightly nearer the center of the said wheel than the pin 90, displaces the bent portion of the shaft 88 slightly more than the said pin 90. By means of this arrangement when a type is delivered between the said back 69 and the jaw 72 the thrusting-feet 76 are brought down upon it three distinct times, the first slightly protruding the type from the said jaw, the second further protruding the said type, and the third thrusting it entirely out of engagement therewith. These impacts are given to the thrusting-feet by means of the pins 90, 91, and 92 upon the periphery of the driving-wheel actuating the bent portion of the shaft 88, which draws the crank-arm 87 back in proportion as the said bent portion is moved to one side by the said pins. The motions are transmitted along the pitman 86 to the crank 85, to the bell-crank 80, to the pitman 79, and the perpendicular rod 77, which, being rigidly attached to the said thrusting-feet, expels or forces the type out of engagement between the said jaw and the said back in proportion as the said bent portion of the shaft 88 is moved by the said pins upon the periphery of the driving-wheel. In this operation just described the type are being transferred into a moving body. It is to accommodate this that the said mechanism is pivotally mounted at the top of the frame 67. The position of the said mechanism is regulated by the stop 89, Fig. 15, which is rigidly attached to the frame 67. The said mechanism is maintained in its position against the said stop by the spring-actuated arm 90$^a$, which is rigidly attached to a pivotal shaft 91$^a$ near the top of the frame 67, which is provided with a coil-spring tending to force the end of the said arm against the said stop.
One end of the back 69 extends to the side of the frame and rests between the said arm and stop. In operation the said arm allows the said mechanism to move with the chain until disengaged therefrom, when it returns the same into position against the stop 89 for the reception of a second type. The gage 69$^a$ above referred to consists in the preferred construction and, as shown, of a piece of angle-iron held in position by a set-screw, so as to be easily adjusted or removed and gages of different size substituted.

Extending under the transferring mechanism 68 and across the edge of the said feed-table is the distributing-channel 95. The said channel is constructed and grooved, substantially as shown, in small half-sections, which are joined together to form the said channel, the joined ends on either side of the said channel lapping, so as to form a solid structure. The channel is made, as herein described, by smooth castings; but it is obvious that it may be cut or cast from a solid piece of metal. At either end of the said channel are the corresponding wheels 97 and 98, the latter being an idler. The wheels are grooved substantially as shown and provided with notches 99, whereby the links of the carrying-chain are engaged. Mounted in the said channel and turning upon the said wheels is a chain composed of the links 100. The links, Figs. 11, 12, 13, 17, 35, 44, 45, 46, 47, and 48, consist of the body 101, the pivoted jaw 102, the clamping-jaw 103, and the elevator 104. The said body is provided on the under side with the elongated lug 105, upon one side of which is the guide-flange 106. At the forward end of the said lug is a thin piece of metal having a perforation in the center and rounded, substantially as shown, to form the flexible joint 107, the said lug being cut away at the point at which the said link is attached to correspond to the curve of the same. In line with said link and at the other end of the said lug is cut a slot 108, corresponding to the said link. Through the sides of the said lug, extending through the side of the said slot 108, is a perforation, in which is mounted the screw 109, the head of which extends to the side of the said lug opposite to that having the guide-flange 106, and by means of which the said chains are propelled over the driving-wheel 97. Extending up from the said body is the arm 110, upon which is pivotally mounted the jaw 102. The said jaw extends down from the said arm, and is provided upon either side of the said body with the depending lugs 111, in the sides of which are set the pins 112. When resting in their normal position, the said pins upon the said jaw are slightly forward of the pivotal bearing of the same, whereby when raised they turn the said jaw upon its pivotal bearing. In the face of the said jaw are three slots, which are provided for the guides 113 of the elevator 104, the said slots extending to near the upper surface of the said jaw. The said elevator is mounted in the said slots and is provided with the small platforms 114, which are joined at the bottom to a cross-bar 115, in the center of which is fixed the guide-rod 116. The said guide-rod is mounted in a perforation provided in the elongated lug 105 of the body 101. The outer end of the cross-bar 115 are depending legs extending below the same upon either side of the said body 101. At the forward end of the said body 101 are the upwardly-extending arms 117. Through perforations in the end of the said arms pass the guide-rods 118 of the clamping-jaw. The said rods also pass through corresponding perforations provided in the body 101. Mounted upon the said rods is the clamping-jaw 103, which is provided with the square face fitting flush with the face of the said pivoted jaw 102, the upper edges of the same being flush. Attached to the said clamping-jaw is the lever 119, beneath the said clamping-jaw and extending down through a slot in the elongated lug 105 provided therefor, and extending slightly beyond the lower face of the same. Attached to the said lever is a spiral spring 120, which is so mounted upon the same that it tends to keep the said clamping-jaw closed against the said pivoted jaw. In the said clamping-jaw are cut slots to allow the elevator 104 to approach near the upper surface of the same. When constructed as herein described, the said links are joined together to form the chain by inserting the thin piece of metal 107 in the slot 108 of the adjoining link, and passing the screw 109 through the same. By this means the rounded shoulder of the slotted end of the elongated lug turns on the rounded shoulder at the rear of the links adjoining, allowing the said chain to bend around the said wheels 97 and 98. When thus joined, the said chain is mounted in the said channel 95 and around the said wheels 97 and 98, the head of the screw 109 engaging the slots 99 in the periphery of the said wheels, the elongated lugs resting in the annular slot around the periphery of the said wheels, and the bottom of the body 101 resting upon the periphery of the said wheels between the said slots 99.

In the distributing-channel 95 are the rails 121, the upper surface of which is upon a level with the upper edge of the said wheels 97 and 98. The said rails are separated far enough for the elongated lugs 105 to pass between, and are provided underneath with the grooves 122, adapted to receive the guide-flange 106 and the head of the screws 109. Between the said rails and the sides of the said channel are formed the grooves 123 to receive the ends of the depending legs of the elevator 104, and in the sides of the said channel, above the said rails, are the grooves 124, which receive the pins 112 of the pivoted jaw 102. At the end of the channel, next to the wheel 97, the rails 121 are rounded in conformity to the curve of the said wheel and extend over the same, ending in a fine edge close to the periphery, whereby the links of the said chain are disengaged from the said wheel by the ends of the rail passing under the body 101 and conveying them into the channel. In entering into the said channel the guide-flanges 106 extend into the said grooves 122 and hold the said links firmly upon the said rails.

In the grooves 124 and under the transferring mechanism 68 are the inclined planes 125, Figs. 28 and 53.

At the bottom of the distributing-channel and extending into the annular grooves of the driving-wheel slightly in front of the transferring mechanism is the small steel plate 126, interposed in the path of the lower end of the lever 119, extending from the bottom of the links of the endless chain.

The driving-wheel 97 of the carrying-chain is operated from the same center as the feeding mechanism, and is timed to deliver a link under the said mechanism while the feed-bar 37 is moved backward after having delivered a type to the transferring mechanism. As each link of the carrying mechanism approaches the transferring mechanism, the forward edge of the pivotal jaw 102 is slightly raised in the path of the lower edge of the back 69 of the said carriage, caused by the means of the pins 112 passing over the inclined planes 125 in the grooves 124 of the said channel, forcing the said transferring mechanism back against the pivoted arm 90. As the said pivoted jaw is thus raised the end of the lever 119 comes in contact with the edge of the small steel plate 126 and is forced back thereby, and the clamping-jaw 103 is opened to its full extent. This remains so while the said lever is passing over the said plate, when it is allowed to drop and the coiled spring 120 thrusts the said clamping-jaw toward the pivotal jaw, grasping firmly the type which has been delivered therein. As the said clamping-jaw passes under the transferring mechanism and before the raised edge of the pivoted jaw reaches the same, the type held in the said carriage is protruded below the lower edge of the back 69 by the thrusting-feet 76, which have in this position of the parts received one impact by the first pin 90, thrusting to one side the bent shaft 88. At this point, while the said type is held firmly in the said delivery-carriage the raised edge of the pivotal jaw comes in contact therewith, the pivoted arm allowing the delivery-carriage to fall slightly back. The type is thus held firmly between the said pivoted jaw and the back 69 of the delivery carriage, while the thrusting-feet 76 receive two impacts by the remaining pins actuating the bent shaft 88. At the impact imparted by the pin the type is expelled entirely from the delivery carriage into the said link, and by the impact imparted by the pin 92 the thrusting-heads are carried below the said carriage, forcing the pivotal jaw 102 flush with the clamping-jaw 103 by the said feet coming in contact therewith. In this position the delivery-carriage being free from the said link, the spring-pressed arm 92$^a$ forces it back to its normal position in front of the gateway 42. Before the last impact is imparted to the said type the end of the lever 119 passes over the edge of the steel block 126 and allows the clamping-jaw 102 to rest against the said type, holding it firmly in position while carrying it along the distributing-channel. In the movement of this chain it is desired that when the type are being fed into and delivered from the said link the carrying-chain should move slowly without altering the movement of the feed mechanism. This is accomplished by mounting upon the shaft 127 of the driving-wheels 10 the eccentric cog-wheel 128, to which is geared a corresponding cog-wheel 129. The said cogs are so mounted as to present the short axis of the one to the long axis of the other at each half-revolution, substantially as shown in the drawings. (See Figs. 32 and 33.) The cog-wheel 129 is mounted upon a short shaft 130, bearing the beveled pinion 131 and mounted in the frame of the feed-table. The pinion 131 is geared with a beveled cog-wheel 132, which is mounted upon a perpendicular shaft 133. The said perpendicular shaft is mounted in bearings in the under surface of the feed-table and in the cross-bar 134, which is securely mounted to the frame of the said feed-table. The said cog-wheel 132 is provided upon the under side with the beveled pinion 135, which is geared into the large beveled cog-wheel 136. The beveled cog-wheel 136 is rigidly mounted upon the shaft 138, upon which is rigidly mounted the driving-wheel 97 of the carrying-chain, which is mounted in the cross-bar 134, substantially as shown.

In transmitting the motion from the driving-wheels 10 10 to the driving-wheel 97 through the geared eccentric-cogs 128 and 129 the result is to give to the said driving-wheel a continuous but alternating fast and slow movement. The arc of the movement of the long radius of the wheel 128 is greater than that of the short radius of the said wheel for a given time. The said wheels 128 and 129 correspond, and are geared, as hereinbefore stated, so that the long radius of the one is presented to the short radius of the other at each half-revolution. When the long radius of the wheel 128 is presented to the short radius of the wheel 129, the shaft 130 is revolved farther than the shaft 127, because the arc of the movement of the long radius upon the wheel 128 is greater than the arc of the small radius of the wheel 129 for the same revolution of the shafts, thereby causing the said shaft to revolve the same distance as the shaft 127 plus the difference between the two arcs, and imparting to it a corresponding faster movement. This is continued in proportion as the radius of the part of the wheel 128 is greater than the radius of the wheel 129, to which it is attached, gradually lessening the speed of the shaft 130 as the equal radii of the said wheels are presented to each other. From this point to the completion of the one half-revolution the wheel 128 is presenting the shorter radius of the said wheel to the longer radius of the wheel 129, lessening the speed of the rotation of the shaft 130 in proportion as the radius of the wheel 129 exceeds that of the wheel 128 at the point of contact. At this point, one arc of the movement of the short radius of the wheel 128 over a given distance of the said shafts being less than the arc of the movement of the long radius of the wheel 129 the short axis rotates the shaft 130 the same distance as the shaft 127 minus the difference between the arc of the said portions in contact. By this means at every complete revolution of the shaft 127 which is regular is imparted to the shaft 130 an alternating fast and slow movement, which, by means of the gearing hereinbefore described, is transmitted to the driving-wheel 97, and which intermittent motion allows the necessary time, as hereinbefore stated, for the type to be fed into the said links and for the same to be delivered. In the sides of the said channel 95 are formed perforations. The said perforations are located opposite each other and are provided with the barrel-springs 141, Fig. 8, extending through the same. The said barrel-springs consist of the round barrel 141, which is mounted rigidly in the head 142, and is provided with a slot in its upper side for the insertion of the spring 143. The said spring is rigidly inserted in the head 142, where it vibrates freely in the slot of the barrel 141, and is rounded upon the free end, substantially as shown. (See Fig. 8.) The said head 142 is provided with the standard 144 and is secured thereto by means of the screw 145, which enters threaded perforations in the said head. In the foot of the standard is an oblong slot, (dotted lines, Fig. 7,) which allows the said spring 143 to be adjusted in and out of the said perforations, as may be desired, and set by means of the screw 146. The said spring extends into the grooves 123 and is interposed in the path of the lower ends of the legs of elevators 104 of the carrying-chain. Rigidly mounted over the said channel 95 and secured upon either side of the same are the combination-plates 147. Secured in the under surface of the said combination-plates are the runners 148, which form the various combinations for the said plates. Each plate is provided with a different combination or adjustment of the said runners. The said runners are level upon the bottom and are adapted to rest upon the top surface of the links of the said chain. The rear end of the said runners are rounded, substantially as shown, (see Figs. 8 and 9,) to prevent catching the edges of the links. Between the said runners, in the forward end of the said plates, is a slot 149. Passing through the said slot and through the said combination-plates is a perforation in which is mounted the rod 150. The said rod is grooved upon the ends, substantially as shown, mounting upon the same the trigger 151 and the end of the knuckle 153. The said trigger is mounted, as described, in the slots 149 and extends below the under surface of the said combination-plates to a level with the edges of the said runners 148. Passing through a perforation provided in the nose of the said trigger is the bent rod 152. The said rod is mounted in perforations in the said plates beside the trigger, (see Figs. 8 and 10,) and is provided with a small spring coiled upon it in the said perforation. By means of the said spring the said rod is depressed upon the said trigger, keeping it in position.

Mounted upon the outer end of the grooved rod 150 is one arm of the knuckle-joint 153, the other arm of which is connected to the small crank-arm 154, which is rigidly connected to the shaft 155. The said shaft passes under the channel 95 and is journaled in the heads of the opposite barrel-springs 141. In the said channel and opening into the grooves 123 are cut the slots 156, Figs. 6 and 7. Mounted upon the said shaft 155 so as to rest in the said slots are the dogs 157, which are adapted to extend above the rails 121 in the path of the lower end of the depending legs of the elevator 104 of the links composing the carrying-chain. Upon either side of the said dogs are the coil-springs 158, which operate to throw the said dogs up into the path of the said legs of the elevators. The said parts are locked in their normal position by two of the arms of the knuckles passing the line between their mountings from the opposite side from that to which they bow, in which position they are held by a shoulder upon one of the arms bearing against the side of the other. The throw of the parts when operating is regulated by the foot 248, which is mounted rigidly upon the ends of the shaft 155, and when the said parts are tripped is forced against the frame of the machine.

Before distributing the type they are provided upon the back with parallel grooves arranged in different combinations, each type of a certain denomination corresponding to one of the combination-plates 147 above the channel. When the type are delivered into the links of the chain and carried through the said channel, the cone-shaped ends of the barrel-springs 141, pressing under the ends of the legs of the elevators, tend to press the type out of engagement between the jaws of the links composing the chain. By this means the type, as they pass in the chain, are pressed against each of the said combination-plates as they pass. In this manner the type bearing the combination of the grooves corresponding to the combination of runners 148 upon any of the said plates is raised against the under surface of the said plates fitting over the said runners thereof. This brings it into the path of the trigger 151, which is thereby forced forward, tripping the knuckle-joint 153, as shown in Figs. 8 and 9, and allowing the spring 158 upon the shaft 155 to thrust the dogs 157 into the path of the said legs of the elevator 104. In passing forward with the chain the elevator is further lifted by means of the said dogs forcing the type nearly out of engagement with the said link and in position to be delivered.

Mounted upon the ends of the said combination-plates 147 are the perpendicular arms 160, the ends of which are perforated to receive the guide-rods 161. Rigidly mounted upon the said guide-rods are the perforated blocks 162. The said blocks are provided with two perforations passing in at right angles to each other, those for the guide-rod 161 and those in which the rod 163 is mounted, for keeping the said blocks in alignment, so as to move together.

Rigidly mounted upon the block 162 are the spring-buffers 164, which are so formed as to throw the free end of the said buffers out in front of the said blocks, substantially as shown. (See Fig. 6.) Mounted upon the said guide-rods in front of the said spring-buffers are the adjusting-blocks 165, whereby the springs are adjusted to operate all at the same time by regulating the expansion of the same. This is done by contracting the springs alike and setting the said blocks in front of and bearing against the said springs, where they are firmly fixed by means of set-screws, which pass through them and impinge upon the said guide-rods.

Mounted upon the rods with said spring-buffers are the planers 166, Fig. 2. The said planers are rigidly attached to the rod 163, the lower edge being level with the edge of the runners 148. The lower edges of the said planers are slightly flared to allow for the movement of the chain while thrusting the type out of engagement with the links. When the type are in the position herein described, above the surface of the links, by the elevator 104 the said planers are swept over the chain and come in contact with the said type, forcing them out of engagement with the jaws of the said links into the chutes 167, provided in front of the said planers between each of the combination-plates. The said chutes lead to separate boxes for containing the type. As the planers are swept forward, as above described, the spring-buffers are carried across the channel and come in contact with the bent rod 152. If the trigger in any of the combination-plates has been tripped, the bent rod is raised and brought forward. Thereby in the forward sweep of the said spring-buffers they reset the triggers by pressing them back into their normal position. This resets the said trigger and forces the knuckles past the line between their mountings, as hereinbefore set forth. This operation is repeated upon each combination-plate as the trigger thereon is sprung, and the bent rod 152 is brought into the path of the said spring-buffers. The said planers and spring-buffers are swept back and forth over the said chain by means of the intergeared driving-wheels 168, which are mounted on the journals or shaft-sections 169. Each pair of wheels is mounted in bearings and is rigidly attached to its shaft and is so mounted as to leave a space between each of the adjoining pairs. In the opposite faces of the said wheels are pivotally mounted the ends of the pitmen 170 and lever 171 alternately between each pair, the wheels being thus connected and having the same movement. The end wheel is rigidly connected to the driving-shaft of the motor. The moving end of the said pitmen 170 are pivotally mounted upon the connecting-rods 172, the ends of which are mounted in the guide-blocks 174, encompassing the rigid guide-rods 173. The said guide-rods are rigidly mounted upon the journals 169 and extend straight up to above the stroke of the said pitmen. The pitmen 170 are so mounted as to bring the plane of movement between two of the guide-rods 161 of the spring-buffers 164. The ends of the said guide-rods 161 are connected by the connecting-bars 175, which are rigidly attached to the ends thereof. Pivotally suspended in the middle of the said connecting-bars are the blocks 176, through which the said pitmen pass. By means of this arrangement of the parts the said spring-buffers and planers are swept across the said chain by the rotation of the wheels 168, the part of the pitman to which the said block 176 is attached moving back and forth as the end of the said pitman, mounted in the face of the wheels is carried around by the same. By means of this arrangement an intermittent movement is imparted to the said spring-buffers and planers, being faster in the forward than in the backward movement. This is accomplished by mounting the one end of the said pitman upon the perpendicular rods 173 and the other near the peripheries of the wheels 168, which cause the full stroke of the forward movement of the part of the said wheels, being the end of the said pitman, to be imparted to the connecting-bar 175. In the backward movement of the said spring-buffers the end of the pitman is at the under side of the said wheels and further removed from the connecting-rod 175, causing thereby less movement of the said blocks for the same amount of movement of the said wheels than in the former instance, the said connecting-rod being nearer the stationary end of the said pitman. This intermittent movement of the buffer-springs and planers is desirable in order that the planers may move rapidly in expelling the said type from the links and give to them an impetus in leaving the said links which carries them into the chutes 167. Further, as the planers are necessarily narrow and the chain is moving, it is necessary to so pass the said planers over the same that they may not miss or only partly extract the type. The chain being continuous, the mechanism mounted upon the channel 95 and the channel itself are duplicated upon the under side of the machine, the chain passing around the idler 98.

To operate the spring-buffers 164 and planers 166 upon its under side, I mount in the coupling-blocks 177, between the alternate pairs of wheels 168, the levers 171, which are fulcrumed in the bearings 178 beneath the said wheels. The ends of these levers are rigidly attached to the connecting-bars 179, which extend between the ends of the guide-rods 161 upon the under side of the machine. By means of this arrangement the same motion is imparted to the spring-buffers and planers upon the under side of the machine as to those upon the upper side, for when the coupling-blocks are at the bottom of the wheels they are moved with the same velocity as when at the top, sliding up and down upon the lever 171 and operating upon the same at different points. At the bottom of the said wheels it is at a shorter distance from the fulcrum 178 than when at the top, thereby imparting for the same motion of the wheels when at the bottom of the same a longer stroke of the said lever than when at the top. The coupling-blocks 177 are so mounted between the wheels 168 with relation to the pitmen 170 as to cause the forward stroke of the spring-buffers and planers upon the lower side of the machine at the same time when the said pitmen cause the same stroke of the spring-buffers and the planers upon the upper side.

The intergeared wheels 168 are so timed with the feeding mechanism that as the links bearing the type pass between the combination-plates 147 the said wheels make that half of the revolution which causes the spring-buffers to sweep across the said chain.

In the drawings I have shown a means of driving the said machine by hand; but it will be understood that steam-power may be substituted therefor. In this mechanism the driving-shaft 185 is mounted in the journal 187, and is connected at one end with the end wheel of the wheels 168, and rigidly attached to the said shaft, and at the other end is the clutch 181. The said clutch-section connects the shaft and drum 183, which is rigidly attached to the driving-wheel 10 of the feed mechanism. (See Fig. 32.) Geared with the beveled cog-wheel 182 is the beveled cog-wheel 184, which is mounted upon the end of the shaft 180, which is provided at the outer end with the handle 186, substantially as shown. The said shaft 180 is mounted in a bracket-bearing which is preferably cast in one piece with the journal 187 to keep the beveled cog-wheel 184 firmly against the cog-wheel 182. By now turning the handle 186 the said shaft 185 is revolved, setting in motion the feed mechanism of the driving-wheel of the chain and the wheels for operating the spring-buffers and planers, all as hereinbefore described.

In a machine of this size delicately constructed and speeding as rapidly as it does there is great danger of the parts becoming clogged and broken. To prevent this I have placed at the points where the clogging is most likely to occur safety attachments, which I will now describe. The first of the attachments is connected to the feed-plate 17. This consists (see Fig. 22) in pivoting the head 19 of the latch 18 to the arm of the said latch and mounting upon the said arm the shaft 188. The said shaft is provided with the depending pin 189, the end of which fits into the slot 190 in the said head of the latch. The said shaft is further provided with the spiral spring 191, which tends to throw the said head around in its normal position by means of the said pin 189. The end of the said spiral spring rests upon the latch 192, which is pivoted in arm 193ª and provided upon the other end with the pin 194. Extending under the said pin is the grooved end of a bent portion of the shaft 188, the said shaft being bent after passing through its bearing in the arm 193, so as to extend the said grooved end under the said pin. It is by means of resting the latch 192 under the end of the said spiral spring that the shaft 188 is kept from turning. In lifting the pin 193 the said latch 192 is lifted against the end of the spiral spring, and the latch being longer than the said pin a good deal of force is necessary to be exerted upon the said pin to raise the said latch out of engagement with the said spring. By means of this construction, when an obstruction is in the path of the said feed-plate—as, for instance, a partly-delivered type—the said feed-plate strikes solidly against the same, and as the machine is running very fast would either break itself or some of the mechanism. This is prevented by the mechanism herein described, which, when the strain upon the said feed-plate is greater than the resistance of the spring 191 upon the latch 192, the said head of the latch is thrown around out of the path of the lug 14, allowing the cross-bar 12 to move forward to the end of the stroke independently of the said feed-plate. As the head of the latch is thus thrown back, the pins 189 of the shaft 188 are forced to one side, turning the said shaft in its bearings and raising the grooved end of the same under the pin 193, by means of which the latch 192 is lifted out of engagement with the end of the spring 191, allowing the said shaft to revolve freely. When the obstruction is removed, the parts are replaced in their normal position by moving the head of the latch in position, so that the pin 189 rests in the slot 190. In this position the end of the shaft 188 rests in the path of the pin 193, which is brought down over the same by placing the latch 192 under the end of the spring 191. This is accomplished by forcing the end of the spring to one side, raising and placing it over the said latch, it being bent up, so as to form a handle for that purpose.

The second of the attachments is connected to the feed-bar 37 when an accident occurs to the chain, which stops it either with a filled link opposite the gateway 42 or a part of the said link not adapted to receive type, or when two type adhere together and become clogged in the said gateway. In these conditions if the said feed-bar were rigidly held and forced ahead it would either be broken itself or break some of the surrounding mechanism. To prevent this I have attached the said feed-bar to the cross-bar 12 by means of the finger 35, which extends beyond the pin 38 upon the said feed-bar and is pressed against it by means of the coil-spring 36 upon the swivel 15. When any of the obstructions above mentioned arise in the path of the feed-bar and the strain becomes greater than the resistance of the said coil-spring the finger 35 is forced back by the forward movement of the cross-bar 12 until it passes the pin 38 upon the said feed-bar, the said cross-bar continuing to the end of its forward stroke independently of the said feed-bar. In the backward stroke of the said cross-bar the pin 38 is caught by the same and forced out of the way. By this means the feeding mechanism is brought to a stop without any jar or damage thereto, as the mechanism operating the feed-plate 17 cannot be brought into operation until the type in the feedway 29 have been distributed and the presser-foot 53 of the feed-arm 51 has reached the side wall of the said feedway next the gateway 42. When the obstruction has been removed, the feed-bar 37 is re-engaged with the cross-bar 12 by throwing the finger 35 back and moving the said feed-bar forward until the pin 38 rests against the cross-bar 12, when the finger is released and the feed mechanism allowed to continue its operation.

The third of the attachments is placed in the gateway 42 when a clogging of the same is liable to occur by two type which have firmly adhered to each other attempting to pass through the said gateway at the same time. To prevent this I have placed at the rear of the feedway 29 the steel plate 195, Fig. 24, the end of which extends into the said gateway, leaving a space between it and the side wall of the said feedway only large enough for one type to pass without impinging upon it. The steel plate is especially useful where the type being distributed are provided with wedge-shaped ends. For in this instance when they adhere together the said ends enter the said gateway and would clog the passage if the end of the said plate were not interposed. If larger type than ordinarily used are being distributed, and which impinge upon the said plate, if the said plate were stationary it would prevent the passage of the same. I provide for this emergency by mounting the said plate upon the pins 196, over which are placed the slots 197 of the said steel plate, the said pins acting as guides. Mounted on the top of the said steel plate is the lug 198. Passing through a perforation in this lug and mounted rigidly in a corresponding lug 199 upon the feed-table is the guide-rod 200. Coiled about the said guide-rod and bearing against the said lugs is a coiled spring 201, which tends to throw the said feed-plate into position in front of the gateway 42. By this means when the large type, as herein mentioned, comes in contact with the end of the said steel plate the spring 201 contracts and allows the same to fall back away from the said gateway, allowing the said type to pass through.

The fourth of the attachments is placed in the feedway 29 in the path of the presser-foot 53. If in the operation of this machine the feed-channel 1 should be allowed to become emptied from negligence or otherwise and the type distributed out of the feedway, the presser-foot would rest against the side wall of the said feedway next to the gateway 42. In this position, as hereinbefore described, the feed-plate would be engaged with the cross-bar 12 by means of the finger 54 and the presser-foot would be carried forward to the end stroke, and when the finger 54 was released from contact with the rear shoulder of the flange 59 by the lifting-rod 62 the presser-foot would be driven back by the coil-spring 65 against the side wall next the gateway, striking the thin metal of the feed-bar 37 and placing the finger 54 in position to be again operated to engage the feed-plate to the cross-bar 12. This operation would be repeated at every stroke of the cross-bar 12, the presser-foot 53 pounding against the thin metal of the feed-bar, as aforesaid. To prevent this I have provided the pivoted stop 202, Figs. 25 and 26. The said stop is provided upon the side next to the gateway with a beveled surface, and is pivotally mounted at the rear of the said feedway 29, where it is provided with the coil-spring 203, which tends to throw it into the said feedway. Normally it rests on the line of type; but when the feedway becomes emptied the said stop is forced by the coil-spring down into the same behind the presser-foot, so that when the said presser-foot returns it raises and passes under the said stop by means of the beveled surface of the same. The said stop is thus interposed in the path of the said presser-foot, preventing it from going to the end of the feedway next to the gateway, and thereby preventing the feed-plate 17 from becoming engaged with the cross-bar 12. The pounding of the presser-foot against the thin metal of the feed-bar 37 is thereby prevented. The said stop remains in this position until a line of type is delivered into the feedway. When this is done, the said stop passes over the line of type by means of the beveled forward end and rests upon the same while it is being distributed. The presser-foot 53 now passes freely under the said stop behind the said line of type. When the said presser-foot passes with the said line of type, the said stop falls into position behind it ready to prevent the forward movement of the same unaccompanied by a line of type.

The fifth of the attachments is placed in the mechanism for operating the transferring mechanism. An accident is liable to occur when the thrusting-feet 76 of the said mechanism are thrusting the type from between the back 69 and the jaw 72 of the same when the link into which it is delivering the type is already filled or the carrying-chain has stopped, so as to present a part of the link not adapted to receive the type. In this position, if the parts were rigid the transferring mechanism or some of the parts contiguous thereto would be broken. To prevent this I have divided the pitman 86 into two parts, the part that is attached to the crank 85 of the shaft 84 being a hollow tubing and the part that is attached to the crank 87 being a small rod 204, passing through the said tubing and provided upon the end with the head 205. Between the said head and the said tubing and coiled around the small rod 204 is a spiral spring 206, which tends to thrust the said head away from the said tubing. By this means when the strain upon the said thrusting-feet 76 is greater than the resistance of the said spiral spring the same contracts, allowing the bent portion of the shaft 88 to pass the pins 91, 92, and 93 without exerting a breaking-strain upon the said transferring mechanism. The said coil-spring is sufficiently strong to thrust the type into the said links while contracting before the strain becomes sufficient to break any of the parts. In the condition of the links just mentioned, or when the thrusting-feet 76 have not forced the pivoted jaw 102 of the link into position so as to allow the said link to pass under the transferring mechanism, if the feed-bar were allowed to force another type into the said transferring mechanism, it would either break itself or some part of the said mechanism. This is prevented by placing at the rear of the said carriage the spring 207, Figs. 14 and 17, rigidly attached to the end of the shaft 208, which is pivotally mounted in the feed-table and provided with the spring 209, which rests against the side of the driving-wheel 10, Figs. 3, 14, and 17. Upon the other end of the said shaft is mounted the lug 210, which extends under the latch 211. The said latch is pivotally mounted at the end toward the delivery-carriage in the block 212, and is provided at the free end with a square shoulder which extends, when raised, in the path of the said cross-bar 12. The shaft 208, the lug 210, and the latch 211 normally rest below the surface of the feed-table in a slot in the same provided therefor. The block 212 is rigidly mounted upon the guide-rod 213. The said guide-rod is mounted in bearings 214, suspended from the under side of the feed-table, and is provided at the outer end with the head 215 and the adjoining bearings 214, between which is the heavy buffer-spring 216, which tends to throw the said head away from the said bearing. The inner side of the driving-wheel 10, against which the spring 209 rests, is provided with the groove 217, which extends around half of its circumference. The said groove is wide enough to allow the free end of the spring 209 to fall therein and deep enough to allow the shaft 208 to turn and relieve the strain upon the springs.

At the end of the distributing-channel next to the driving-wheel 97, upon the under side of the machine, is provided a combination-plate without the runners 148. By means of this construction any type which has missed being delivered in its correct chute, either by a wrong cutting of the grooves in the said type or from any other cause, when it reaches this combination-plate is raised by the end of the barrel-spring 141 against the surface of the said combination-plate, where it trips the trigger 149 and is expelled from the link by means of the planers 166, as hereinbefore mentioned, before the same passes around the driving-wheel 97 to the transferring mechanism. When the parts just described are thus mounted and the delivery-carriage is forced back, as before stated, it forces the spring 207 back, which partially rotates the shaft 208, pressing the spring 209 against the driving-wheel 10. This lifts the latch 211 above the surface of the feed-table by means of the lug 210. As the parts are so timed that one link of the chain is passing under the transferring mechanism as the cross-bar 12 is moving back, the action forcing the transferring mechanism against the spring 207 takes place before the said cross-bar has reached the extreme rearward movement, throwing the latch 211 into its path as it moves backward. The said latch, being pivotally attached to the block 212 under the feed-table and extending away from the transferring mechanism, presents an inclined surface to the said cross-bar while moving backward. The said cross-bar depresses the said latch by riding over the said inclined surface until it passes the same, the spring 207 allowing the shaft 208 to move around and forces the square shoulder at the rear of the latch up in its path. When now the said cross-bar moves forward, carrying the feed-bar 37, it strikes against the said latch and is stopped thereby. In thus stopping the cross-bar the shock is taken off the machine by means of the large spring 216. The latch 211, being mounted in the block 212 and between the bearing 214 and the head 215 of the same, is interposed in the path of the ends of the said spring 216, whereby when the shock comes upon the latch 211 it is transmitted to the guide-rod 213, where it is taken up by the said spring 216. In the position just described the spring 209 rests in the groove in the side of the driving-wheel 10, where it remains after the obstruction has been removed and the transferring mechanism allowed to resume its normal position. As the cross-bar 12 is carried forward, the end of the said slot is reached and the said spring is forced back, resting against the surface of the wheel. This rotates the shaft 208 back to its normal position, forcing, by means of the lug 210, the latch 211 below the surface of the feed-table and out of engagement with the cross-bar 12. In thus suddenly stopping the cross-bar 12 the pitmen 11 are liable to be broken or the cross-bar 12 itself to be bent. To prevent this I mount the clutch 181 to the drum 183 by means of a spring-connection, Figs. 31 and 32. In the periphery of the said clutch is the V-shaped notch 218, into which is fitted the pawl 219, which is pivotally mounted upon the drum 183. Upon the other side of the pivotal bearing of the said pawl is provided an arm. The said arm rests against the face of the stirrup 220, in which is mounted the end of the circular spring 221, which extends around the side of the clutch 181, and is rigidly attached at the other end to the drum 183, being slightly expanded. The said spring is re-enforced by a shorter spring, which is laid over it, and the combined springs operate to force the stirrup 220 against the upper arm of the pawl 219. In this position the said pawl is held firmly in the notch 218 in the clutch. When the cross-bar is stopped suddenly, as above described, and the strain is greater than the resistance of the springs 221 in the drum, they allow the shoulder of the pawl 219 to press the stirrup 220 back, and the said pawl to disengage itself from the notch 218 in the clutch. In this position the driving-shaft may be rotated independently of the feeding mechanism of the machine. At each rotation of the driving-shaft the pawl 219 falls into the notch 218 upon the clutch, and when the latch 211 is removed from in front of the said cross-bar and the resistance against the springs 221 is removed the said pawl falls into the said notch in the clutch, carrying the driving-wheels 10 10 around and continuing the operation of the feed mechanism.

If in the progress of the chain in the distributing-channel any of the parts become disarranged, or in the vibrations of the machine any of the type be partly dislodged from the links, so as to clog the channel and stop the movement of the chain, to carry the chain forward with the full force of the motor would cause the chain to break itself or break some of the combination-plates. To prevent this I have mounted the driving-wheel 97 of the chain upon a sleeve 225, Fig. 32, which is mounted on the driving-shaft 138. Upon the outer end of the said sleeve is mounted the solid wheel 226, preferably provided with a handle, by means of which when disengaged from the shaft 138 the chain can be moved independently of the feed mechanism. After the feed mechanism has stopped the broken part of the said chain may be brought to the opening in the channel provided therefor, (just in front of the transferring mechanism,) extracted, and replaced by a perfect part; also, by this means, when the chain is clogged by a broken or dislodged type the same may be moved back or forth until the type can be reached between the combination-plates and extracted.

Rigidly mounted upon the shaft 138 and resting against the outer face of the solid wheel is the safety attachment, by means of which the carrying-chain is disconnected from the feed mechanism. The said attachment consists (see Figs. 29 and 54 to 57) of the body 227, tooth 228, finger 229, and the lever 230, all mounted on the shaft. The said tooth is provided with a shaft 231, journaled in the said body. At the other end of the said shaft is provided the arm 232. The said finger 229 is pivotally mounted upon the said shaft and is actuated by the coil-spring 233, attached to the said body, so as to throw the free end of the said finger toward the solid wheel. Mounted upon the side of the said finger near the said shaft is the pin 234, which is adapted to rest over the end of the lever 230. The said lever is journaled in the body 227 and is provided at the other end beyond the bearing with the small latch 235, which is adapted to rest over the end of the arm 232. A notch 226ª is formed in the face of the solid wheel in the path of the tooth 228. When running smoothly, the said tooth rests firmly in the said notch, and the body 227 being rigidly mounted upon the end of the shaft 138 the solid wheel, the sleeve 225, and the driving-wheel 97 are rotated with it; but when the chain becomes clogged and is stopped, as hereinbefore mentioned, before the strain upon any of the parts becomes heavy enough to break them the tooth 228 is forced out of the notch 226ª in the solid wheel by the end of the arm 232 rising and lifting the small latch 235, which raises the lever 230 past the pin 234 upon the finger 229, allowing the finger to fall into position under the said lever. In this position the shaft 231 is free to turn, and the tooth 228 being raised out of engagement with the notch 226ª allows the safety attachment to revolve with the driving-shaft independently of the said wheel. In this position the feed mechanism of the machine is allowed to operate independently of the carrying-chain.

When the chain stops, as hereinbefore described, independently of the feed mechanism, if the feed-bar 37 were allowed to deliver a second type to the transferring mechanism, the said type would be jammed in the gateway 42, or striking some of the delicate parts of the transferring mechanism would break the same. It is to prevent this that I have provided the rods 238 and 239. The rod 238 is pivotally mounted on the under side of the machine, extending to both sides thereof. It is provided upon the side upon which is mounted the solid wheel 226 with the loop 240. The said loop is so formed as to allow the handle upon the solid wheel to pass under it, and is provided upon the end with a small head, which fits in a perforation in the end of the driving-shaft 138. Between the pivotal bearings of the said rod and coiled around the same is the spring 241, adapted to throw the said end of the loop away from the solid wheel and deposit it in the channel 242, provided upon the chute nearest the said solid wheel. At the outer end of the said rod is provided a plate 243, rigidly attached thereto. Resting against the said plate is a similar plate 244 on a rod 239, which is mounted at the one end in bearings in the body of the machine and at the outer end in the feed-table, said shaft being provided upon the end mounted in the feed-table with the bent portion 245. The said bent portion is flattened at the end and is adapted to rest under the feed-bar 37, where the said feed-bar extends beyond the feed-table. The said rod is provided with the springs 246, coiled about it, tending to throw the said bent portion of the rod against the feed-bar and to press the plate 244 firmly against the plate 243 of the rod 238. In the under side of the feed-bar is provided the slot 247, adapted to receive the end of the said bent portion of the rod 239.

Pivotally mounted upon the body 227 of the safety attachment for disconnecting the carrying-chain from the feed mechanism is the yoke 248, the outer end of which extends over the periphery of the solid wheel 226. The said yoke is adapted to pass over and rest against the end of the driving-shaft 138, and is provided with the notch 249, resting over the perforation in the end of the same. The said notch is adapted to fit the end of the said hook 240 next to the head upon the end, and to retain the said head in the said perforation. In the periphery of the said wheel, resting against the end of the said yoke when in the position just described, is the pin 250. When the tooth 228 is disengaged from the notch 226ª in the solid wheel and the safety attachment turns independently of the said wheel, the pin 250 in the periphery of the said wheel strikes against the end of the yoke 248 and forces the same off the end of the driving-shaft 138. The loop 240 upon being released springs out of the perforation in the end of the driving-shaft. In this position the coil-spring throws the said loop over into the channel 242, rotating the rod 238 and throwing the plate 243 back from the plate 244 of the rod 239, which, being thus allowed to act, rotates the said rod and forces the flattened end of the bent portion 245 against the under side of the feed-bar 37. As the said feed-bar finishes its stroke and starts forward to deliver the second type to the transferring mechanism the flat end of the said bent portion 245 falls into the slot 247 and stops the said feed-bar. The said feed-bar being thus stopped, the finger 35 upon the swivel 15 is forced back until it passes the pin 38 upon the feed-bar, allowing the cross-bar 12 to operate back and forth independently of the said feed-bar, as hereinbefore described.

What I claim is—

1. In a type-distributing machine such as described, the combination of a galley, a feed-plate moving transversely to the column of type held in the said galley for extracting the lines of the said column therefrom successively, a latch interposed between the driving mechanism of the machine and said feed-plate, a feed-bar moving in a plane intersecting the ends of the said lines and extracting the type singly therefrom, a side feed for advancing the said lines so as to place the succeeding type in the path of the said feed-bar, and an arm moving in unison with the said side feed for operating the said latch to interpose it between the said driving mechanism of the machine and feed-plate, substantially as set forth.

2. In a type-distributing machine such as described, the combination of a galley, a feed-plate moving transversely to the column of type held in the said galley for extracting successively the lines of the said column therefrom, a latch interposed between the driving mechanism of the machine and said feed-plate, a side feed for advancing the said lines so as to place the succeeding type in the path of a feed-bar, an arm for interposing the said latch between the driving mechanism and the said feed-plate, and intermediate connections consisting of an arm pivotally mounted upon the machine and connected to a side feed by means of a link, a spring to force the said side feed toward the path of a feed-bar, and the said feed-bar moving so as to intersect the end of the said lines and to extract the type singly therefrom, substantially as set forth.

3. In a type-distributing machine such as described, the combination of a feed-bar for advancing the separate type toward the carrying mechanism, a reciprocating driving mechanism, substantially as described, for operating the said feed-bar, and a yielding connection between the same, substantially as set forth.

4. In a type-distributing machine such as described, the combination of a feed-bar for advancing the separate type toward the carrying mechanism, a reciprocating driving mechanism, substantially as described, for operating the said feed-bar, an arm attached to the said reciprocating mechanism and grasping the said feed-bar, and a spring for retaining the said feed-bar in the grasp of the said arm, substantially as set forth.

5. In a type-distributing machine such as described, the combination of a feed-bar for advancing the separate type toward the carrying mechanism, a reciprocating driving mechanism, substantially as described, extending over the feed-bar for operating the same, an arm pivotally attached to the one and grasping the other of the said reciprocating mechanism and feed-bar, and a spring for retaining the said arm in its normal position, substantially as set forth.

6. In a type-distributing machine such as described, the combination of a feed-bar for advancing the separate type toward the carrying mechanism, a pin extending from the side of the said feed-bar, a reciprocating driving mechanism, substantially as described, extending over the said feed-bar for operating the same, an arm pivotally attached to the said reciprocating mechanism and passing behind the pin on the said feed-bar, and a spring for retaining the said arm pressed against the back of the said pin, substantially as set forth.

7. In a type-distributing machine such as described, the combination of a feed-bar for advancing the separate type toward the carrying mechanism, a reciprocating driving mechanism for operating the said feed-bar, a gage for limiting the advance of the said type, and an elastic attachment in the line of operation of the said feed-bar to relieve the strain upon the said gage, substantially as set forth.

8. In a type-distributing machine such as described, the combination of a feed-bar for advancing the separate type toward the carrying mechanism, a driving mechanism, substantially as described, extending over and operating the said feed-bar, an arm pivotally attached to the one and grasping the other of the said driving mechanism and feed-bar, a spring for retaining the said arm in the position in which it grasps the said bar for relieving any strain upon the said feed-bar, and a gage for limiting the advance of the said type placed in the path of the said feed-bar, substantially as set forth.

9. In a type-distributing machine such as described, the combination of a feed-bar for advancing the separate type toward the carrying mechanism, a driving mechanism, substantially as described, for operating the said feed-bar, and a transferring mechanism, substantially as described, for receiving the type as they are advanced by the said feed-bar and delivering them to the carrying mechanism, and a gage for limiting the advance of the said type into the said transferring mechanism, substantially as set forth.

10. In a type-distributing machine such as described, the combination of a feed-bar for advancing the separate type toward the carrying mechanism, a driving mechanism, substantially as described, for operating the said feed-bar, a carrying mechanism, substantially as described, for receiving and conveying the said type to their destinations, and a gage for limiting the advance of the type into the said carrying mechanism, substantially as set forth.

11. In a type-distributing machine such as described, the combination of a reciprocating cross-bar connected to a driving mechanism, a feed-plate for separating the succeeding lines from the galley of the machine, and a latch interposed between the said cross-bar and the feed-plate, substantially as set forth.

12. In a type-distributing machine such as described, the combination, with a latch for connecting the mechanism for separating the succeeding lines from the galley and the driving mechanism of the machine, which consists of two arms and a spring connecting the same and tending to draw them together, of a latch for interposing itself in the path of one of the said arms when drawn back to prevent its return, substantially as set forth.

13. In a type-distributing machine such as described, a latch for connecting the mechanism for separating the succeeding lines from the galley and the driving mechanism of the machine, which consists of two arms pivotally mounted on either the said mechanism for separating the lines or the said driving mechanism, a spring connecting the said arms tending to draw them together, and a spring for rotating them jointly, and a latch for interposing itself in the path of one of the said arms when drawn back for preventing its return, substantially as set forth.

14. In a type-distributing machine such as described, a latch for connecting the mechanism for separating the succeeding lines from the galley and the driving mechanism of the machine, which consists in the combination of two arms, two collars, the one encompassing the other and each rigidly attached to one of the said arms, a spring coiled about the outer of the said collars and attached to the inner and tending to draw the said arms together, a pin upon which the said collars are mounted, and a spring coiled upon the said pin and attached to the said collars for rotating them jointly, substantially as set forth.

15. In a type-distributing machine such as described, the combination of a feed-plate for separating the succeeding lines from the column of type being distributed, a reciprocating driving mechanism, substantially as described, for operating the said feed-plate, a projection or catch, a latch for engaging therewith for connecting the said feed-plate and reciprocating driving mechanism, which consists of two arms and a spring connecting the same and tending to draw them together, a latch for interposing itself in the path of one of the said arms when drawn back to prevent its return, and a latch for releasing the said arm by depressing the end of the said interposed latch after each of the said lines of the column of type have been separated, substantially as set forth.

16. In a type-distributing machine such as described, the combination of a feed-plate for separating the succeeding lines from a column of type being distributed, a reciprocating mechanism, substantially as described, for operating the said feed-plate, a projection or catch, a latch engaging therewith for connecting the said feed-plate and reciprocating mechanism, which consists of two arms and a spring connecting the same and tending to draw them together, a latch for interposing itself in the path of one of the said arms when drawn back to prevent its return, a latch for releasing the said arms by disengaging the said interposed latch after each of the said lines of the said column of type has been separated, and a spring for disconnecting the said feed-plate and driving mechanism by forcing the latch out of engagement, substantially as set forth.

17. In a type-distributing machine such as described, the combination of a reciprocating cross-bar connected to the driving mechanism of the machine, a feed-plate moving transversely to the column of type being distributed for separating the succeeding lines therefrom, a projection or catch, a latch engaging therewith for connecting the said cross-bar and feed-plate, which consists of two arms pivotally mounted upon the said feed-plate, and a spring connecting the said arms and tending to draw them together, a latch for interposing itself in the path of one of the said arms when drawn back, and a lever connected to the side feed for moving the said arm back, operating in unison with the said side feed, substantially as set forth.

18. In a type-distributing machine such as described, the combination of a reciprocating cross-bar connected to the driving mechanism of the machine, a feed-plate moving transversely to the column of type being distributed for separating the succeeding lines therefrom, a projection or catch, a latch engaging therewith for connecting the said cross-bar and feed-plate, which consists of two arms pivotally mounted upon the said feed-plate, and a spring connecting the said arms tending to draw them together, a latch for interposing itself in the path of one of the said arms when drawn back, a side feed for advancing the succeeding type of each line for delivery to the carrying mechanism, an arm for setting the said latch so that it will connect the said cross-bar and feed-plate, and intermediate connections between the said side feed and arm for causing them to operate in unison, substantially as set forth.

19. In a type-distributing machine such as described, the combination of a reciprocating cross-bar connected to the driving mechanism of the machine, a feed-plate for extracting the succeeding lines from the column of type being distributed, a latch and co-operating catch for connecting the said cross-bar and feed-plate, a side feed for advancing the succeeding type of each line for delivery to the carrying mechanism, an arm for setting the said latch by being forced against it by the said cross-bar, so that the said latch will connect the said cross-bar and feed-plate, a guide-bar for retaining the said arm in the path of the said cross-bar, and intermediate connections between the said side feed and arm for causing them to operate in unison, substantially as set forth.

20. In a type-distributing machine such as described, the combination of a reciprocating cross-bar connected to the driving mechanism of the machine, a feed-plate for separating the succeeding lines from the column of type being distributed, a latch and co-operating catch for connecting the said cross-bar and feed-plate, a side feed for advancing the succeeding type of each line for delivery to the carrying mechanism, an arm for setting the said latch by being forced against it by the said cross-bar, so that the said latch will connect the said cross-bar and feed-plate, a guide-bar for retaining the said arm in the path of the said cross-bar, a flange for guiding the said arm to the said latch, and intermediate connections between the said side feed and arm for causing them to operate in unison, substantially as set forth.

21. In a type-distributing machine such as described, the combination of a reciprocating cross-bar connected to the driving mechanism of the machine, a feed-plate for separating the succeeding lines from the column of type being distributed, a latch and co-operating catch for connecting the said cross-bar and feed-plate, a side feed for advancing the succeeding type of each line to the carrying mechanism, an arm for setting the said latch by being forced against it by the said cross-bar, so that the said latch will connect the said cross-bar and feed-plate, a guide-bar for retaining the said arm in the path of the said cross-bar, intermediate connections between the said side feed and arm for causing them to operate in unison, a latch for retaining the said arm and side feed when the said latch has been set, and mechanism for releasing the said arm and side feed operating in unison with the said feed-plate, substantially as set forth.

22. In a type-distributing machine such as described, the combination of a reciprocating cross-bar connected to the driving mechanism, a feed-plate for separating the succeeding lines from the column of type being distributed, a latch and co-operating catch for connecting the said cross-bar and feed-plate, a side feed for advancing the succeeding type of each line for delivery to the carrying mechanism, an arm for setting the said latch by being forced against it by the said cross-bar to connect the said cross-bar and feed-plate, a guide-bar for retaining the said arm in the path of the said cross-bar, a flange for guiding the said arm when the same has been forced back by the said cross-bar, and mechanism for releasing the said arm operating in unison with the said feed-plate, substantially as set forth.

23. In a type-distributing machine such as described, the combination of a reciprocating cross-bar connected to the driving mechanism, a feed-plate for separating the succeeding lines from a column of type being distributed, a latch and co-operating catch for connecting the said cross-bar and feed-plate, an arm for setting the said latch by being forced against it by the said cross-bar to connect the said cross-bar and feed-plate, a guide-bar for retaining the said arm in the path of the said cross-bar, a latch for retaining the said arm when the same has been forced back by the said cross-bar, a rod resting under the said arm, and a device connected to the said feed-plate for raising the said rod, substantially as set forth.

24. In a type-distributing machine such as described, the combination of a feed-plate for extracting the succeeding lines from the column of type being distributed, and a retaining device provided with a shoulder to pass behind the lines as they are delivered by the said feed-plate to prevent the return of any of the said type, substantially as set forth.

25. In a type-distributing machine such as described, the combination of a feed-plate for extracting the succeeding lines from the column of type being distributed, a retaining device provided with a shoulder to pass behind the lines as they are delivered by the said feed-plate to prevent the adherence of any of the said type to the said feed-plate upon the return of the same, and a side feed for advancing the succeeding type of the said lines for delivery to the carrying mechanism, substantially as set forth.

26. In a type-distributing machine such as described, the combination of a feed-plate for extracting the succeeding lines from the column of type being distributed, a retaining device provided with a shoulder to pass behind and rest upon the line to prevent the return of any of the said type with the said feed-plate and pieing of the line by the pressure of the side feed, a side feed for advancing the succeeding type for delivery to the carrying mechanism, and a feed-bar operating in a plane intersecting the end of the said lines for separating the type singly therefrom, substantially as set forth.

27. In a type-distributing machine such as described, a feed-bar operating in a plane intersecting the ends of the lines being distributed, said feed-bar being channeled at the end next the said lines to present to the same a thin operating-surface while preserving the strength of the said feed-bar, substantially as set forth.

28. In a type-distributing machine, the combination, with the feeding and constantly-moving carrying mechanisms, substantially as described, of the interposed transferring mechanism delivering type from the feeding to the carrying mechanism and moving in unison with the latter while delivering thereto, substantially as described.

29. In a type-distributing machine such as described, provided with mechanism for separating the type singly from a column being distributed, the combination, with the feed-bar for advancing the type when separated, of jaws placed in the path of the said feed-bar for receiving the type from the said feed-bar and delivering them to a carrying mechanism independently of the action of the said feed-bar, substantially as set forth.

30. In a type-distributing machine such as described, the combination of a mechanism for separating the type singly from a line being distributed, a feed-bar for advancing the said type when so separated, jaws for receiving the said type from the feed-bar and delivering them to a carrying mechanism, and a gage for limiting the advance of the said type between the said jaws, substantially as set forth.

31. In a type-distributing machine such as described, the combination of a mechanism for separating the type singly from a line being distributed, a feed-bar for advancing the said type when so separated, jaws for receiving the said type from the feed-bar and delivering them to a carrying mechanism, a gage for regulating the advance of the said type, and a spring connection placed in the path of the said gage to relieve the shock and accommodate varying lengths of type, substantially as set forth.

32. In a type-distributing machine such as described, the combination of a separating mechanism, a carrying mechanism, and an interposed transferring mechanism, consisting of jaws for receiving the separate type from the separating mechanism, and thrusting-feet for expelling the same therefrom into the carrying mechanism, substantially as described.

33. In a type-distributing machine such as described, the combination of a separating mechanism, a carrying mechanism, and an interposed transferring mechanism consisting of jaws for receiving separate type from the separating mechanism, a spring for retaining the said jaws in contact to hold the type, and thrusting-feet for expelling the said type into the carrying mechanism, substantially as set forth.

34. In a type-distributing machine such as described, the combination of a separating mechanism, a carrying mechanism, and an interposed transferring mechanism consisting of jaws for receiving separate type from the separating mechanism, flared guides attached to the said jaws in the path of the type, a spring for retaining the said jaws in contact to hold the type, and thrusting-feet for expelling the said type into the carrying mechanism, substantially as set forth.

35. In a type-distributing machine such as described, the combination of a transferring mechanism provided with jaws for receiving the separate type, thrusting-feet for expelling the said type connected to the driving mechanism of the machine, whereby motion is imparted to the said thrusting-feet, and a feeding mechanism for advancing the type singly to the said transferring mechanism and connected to the driving mechanism of the machine to operate in harmony with the thrusting-feet of the said transferring mechanism, substantially as described.

36. In a type-distributing machine, substantially as described, the combination, with the carrying mechanism for distributing the individual type, of a movable transferring mechanism for delivering type thereto while in motion, provided with independently-movable thrusting-feet engaging the type to discharge them while the transferring mechanism is in motion, substantially as described.

37. In a type-distributing machine such as described, the combination, with the carrying mechanism for distributing the individual type, of a movable transferring mechanism for delivering type thereto while in motion, and intermittingly-moving thrusting-feet engaging the type in the transferring mechanism to discharge them by successive impulses, substantially as described.

38. In a type-distributing machine such as described, the combination of transferring-jaws for receiving and delivering the separate type to a carrying mechanism, a carrying mechanism for conveying the said type to their destination, and a presser-foot for adjusting the said type in the said carrying mechanism by pressing the parts to a level, substantially as set forth.

39. In a type-distributing machine such as described, the combination of transferring-jaws for receiving and delivering the separate type to a carrying mechanism, expelling-feet resting against the type, a feed mechanism for advancing the separate type to the said transferring-jaws, a wheel connected to the said mechanism for advancing the type, pins set in the periphery of the said wheel, and intermediate connections between the said wheel and the expelling-feet of the transferring-jaws extending into the path of the said pins for causing the said transferring-jaws to deliver the type to the said carrying mechanism by forcing the expelling-feet against the type, substantially as set forth.

40. In a type-distributing machine such as described, the combination of transferring-jaws for receiving and delivering the separate type to a carrying mechanism, expelling-feet resting against the type, a feed mechanism for advancing the separate type, a wheel connected to the said mechanism for advancing the said type, pins set diagonally across the periphery of the said wheel, and intermediate connections between the said wheel and the expelling-feet of the transferring-jaws extending into the path of the said pins for causing the said transferring mechanism to deliver the type to the said carrying mechanism by successive impulses upon the said expelling-feet by the displacement of the parts by the said pins, substantially as set forth.

41. In a type-distributing machine such as described, the combination of transferring-jaws provided with expelling-feet resting against the type for receiving and delivering the said type to a carrying mechanism, a feed mechanism for advancing the separate type to the said carrying mechanism, a wheel connected to the said mechanism for advancing the said type, projections extending diagonally across the periphery of the said wheel, and intermediate connections between the said wheel and the thrusting-feet of the transferring-jaws extending into the path of the said projections for causing the said transferring-jaws to deliver the type to the said carrying mechanism by forcing the said expelling-feet against the type, substantially as set forth.

42. In a type-distributing machine such as described, the combination of transferring-jaws provided with thrusting-feet resting against the type for receiving and delivering the separate type to a carrying mechanism, a feed mechanism for advancing the said type to the transferring-jaws, a wheel connected to the said mechanism for advancing the type, projections on the said wheel, a shaft extending diagonally across the path of the said projections, a spring for retaining the said shaft in the path of the said projections, and intermediate connections between the said shaft and the thrusting-feet of the transferring-jaws for causing the said transferring-jaws to deliver the type to the said carrying mechanism by forcing the said thrusting-feet against the type, substantially as set forth.

43. In a type-distributing machine such as described, the combination of a mechanism for advancing singly the type to be distributed, mechanism for receiving and holding the said type, thrusting-feet for expelling the said type from the said mechanism, a wheel connected to the said mechanism for advancing the said type, projections in the said wheel, and intermediate connections between the said wheel and thrusting-feet extending into the path of the said projections for operating the said thrusting-feet, substantially as set forth.

44. In a type-distributing machine such as described, the combination of a mechanism for advancing singly the type to be distributed, mechanism for receiving the said type, thrusting-feet for expelling the said type from the said mechanism for receiving them, a wheel connected to the said mechanism for advancing the type, projections mounted diagonally across the periphery of the said wheel, a shaft extending into the path of the said projections, and intermediate connections between the said shaft and thrusting-feet, substantially as set forth.

45. In a type-distributing mechanism, the combination, with the feeding mechanism for advancing the type to be distributed singly and the carrying mechanism for conveying the type to their destination, of interposed transferring-jaws movable in the line of the carrying mechanism, whereby the necessity of stopping the same to receive a type is avoided, substantially as described.

46. In a type-distributing machine, the combination, with the feeding mechanism for advancing the type to be distributed singly and the carrying mechanism for conveying the type to their destination, of interposed pivoted transferring-jaws movable in the line of the carrying mechanism, and a spring for holding said jaws forward, substantially as described.

47. In a type-distributing machine such as described, the combination of a feeding mechanism for advancing singly the type to be distributed, a carrying mechanism for receiving and conveying the said type to their destination, and an interposed transferring mechanism consisting of movable holding-jaws for receiving the said type from the said feeding mechanism and delivering them to a carrying mechanism while in motion, substantially as described.

48. In a type-distributing machine, the combination, with the carrying and distributing mechanism, substantially as described, for distributing the individual type, of a transferring mechanism, substantially as described, moving in unison with the carrying mechanism for receiving the type from the line being distributed and transferring the same to the carrying mechanism while in motion, substantially as described.

49. In a type-distributing machine, the combination, with a continuously-moving carrying mechanism, substantially as described, for delivering the individual type to their receivers, of an intermittingly-movable transferring mechanism, substantially as described, moving therewith while delivering type thereto while in motion, and a feed for advancing the type to the transferring mechanism while the same is stationary, substantially as described.

50. In a type-distributing machine, the combination, with a continuously-moving carrying mechanism, substantially as described, for delivering the individual type to the receivers, of a reciprocating transferring mechanism, substantially as described, for delivering type to the carrying mechanism while moving in one direction, and a feeding mechanism, substantially as described, timed to feed the type to the transferring mechanism while the same is stationary, as set forth.

51. In a type-distributing machine, the combination, with a moving carrying mechanism for conveying the type to their individual receivers and a feed mechanism for advancing the type, of a movable transferring mechanism, substantially as described, having a projection thereon and a movable jaw on the carrying mechanism engaging said projection and moving the transferring mechanism with the carrying mechanism while the transfer of type is being made, substantially as described.

52. In a type-distributing machine such as described, the combination of a movable transferring mechanism for receiving and delivering separate type to a carrying mechanism, the said carrying mechanism for conveying the separate type to their destination, and a movable jaw upon one of the said mechanisms for interposing itself in the path of the other, and a foot for resetting the said jaw to allow the said mechanisms to operate independently, substantially as set forth.

53. In a type-distributing machine such as described, the combination of a transferring mechanism for receiving and delivering the separate type to a carrying mechanism having a projection thereon, a carrying mechanism for conveying the said type to their destination, having a jaw upon the chambers thereof extensible into the path of the said projection, and a device for depressing the said jaw into the path of the carrying mechanism to allow the said transferring mechanism to operate independently, substantially as set forth.

54. In a type-distributing machine such as described, the combination of a transferring mechanism for receiving and delivering separate type to a carrying mechanism, the said carrying mechanism for conveying the type to their destination, a projection upon the said transferring mechanism, a jaw upon the chamber of the said carrying mechanism extensible into the path of the said projection, and thrusting-feet mounted in the said transferring mechanism for depressing the said jaw to allow the said mechanisms to operate independently, and intermediate connections between the said thrusting-feet and driving mechanism of the machine for depressing the said feet, substantially as set forth.

55. In a type-distributing machine such as described, the combination of a feed for advancing separate type, a movable transferring mechanism receiving the type thus advanced by the said feed, a movable carrying mechanism operating across the exit of the said transferring mechanism and adapted to receive and carry the type to their separate destinations, cam surfaces or deflectors placed in the path of the carrying mechanism for raising the same to engage the said transferring mechanism or type held therein while the type is being delivered from the transferring mechanism to the carrying mechanism, and deflectors to disengage the said carrying mechanism from the transferring mechanism, after the type has been so delivered, by depressing the carrying mechanism out of the line of engagement, substantially as described.

56. In a type-distributing machine such as described, the combination of a carrying mechanism composed of distinct chambers in which are provided jaws to receive the separate type, a spring to cause the said jaws to retain a pressure upon the type in the said chambers, a lever for opening the said jaws connected to them and extending beyond the said chambers, an obstruction placed in the path of the said lever to cause it to operate the said jaws, a transferring mechanism to receive the separated type and deliver them between the said jaws when opened by the said lever, and a feed mechanism to separate the type from the column and deliver them to the said transferring mechanism, substantially as set forth.

57. In a type-distributing machine such as described, the combination of a carrying mechanism composed of distinct chambers in which are provided jaws to receive the separate type, a spring to cause the said jaws to retain a pressure upon the type in the said chambers, a lever connected to the said jaws and extending beyond the said chambers for opening the said jaws, a cam placed in the path of the said lever to cause it to open the said jaws while the type is being partly delivered between them, a transferring mechanism to receive the separated type and deliver them by degrees, substantially as set forth, whereby the type are grasped by the said jaws before being fully delivered by the said transferring mechanism.

58. In a type-distributing machine such as described, the combination of the carrying mechanism composed of distinct chambers in which are provided jaws to receive the separate type, the one of which is extensible into the path of a transferring mechanism, a spring to cause the said jaws to retain a pressure upon the type, a lever connected to the said jaws and extending beyond the said chambers for opening the former of the said jaws, an obstruction placed in the path of the said lever to cause it to operate the said jaws, cams placed in the path of the said extensible jaw for extending the same into the path of the said transferring mechanism, a transferring mechanism for delivering the type separately to the said jaws, and connections between the jaws, transferring mechanism, and lever, substantially as set forth.

59. In a type-distributing machine such as described, the combination of a carrying mechanism composed of distinct chambers, in which are provided jaws to receive the separate type and one of which is extensible into the path of a transferring mechanism, a spring to cause the said jaws to retain a pressure upon the type, a lever connected to the said jaws and extending beyond the said chambers for opening the said jaws, an obstruction placed in the path of the said lever to cause it to operate the said jaws, cams placed in the path of the said extensible jaw for extending the same into the path of the said transferring mechanism, a transferring mechanism for delivering type separately to the said jaws, presser-feet for forcing the type and extensible jaw to a level of the upper surface of the carrying mechanism after being delivered, and connections between said extensible jaw and transferring mechanism for causing the lever to operate in harmony to keep the type under pressure while being transferred, substantially as set forth.

60. In a type-distributing machine such as described, the combination, with the feed mechanism, substantially as described, for advancing the type singly from a line being distributed, and a carrying mechanism, substantially as described, for conveying the individual type to their destinations, of a driving mechanism for said carrying mechanism, and a pair of eccentric cog-wheels interposed between said driving and carrying mechanisms, whereby an alternately fast and slow motion is given the latter, substantially as described.

61. In a type-distributing machine such as described, the combination of a feed mechanism for advancing the type singly from the column being distributed, a carrying mechanism for receiving the same and conveying them to their destinations, an eccentric cog-wheel mounted upon the driving-shaft of the said feed mechanism, a corresponding eccentric cog-wheel geared with the first, a beveled pinion mounted upon the shaft of the eccentric cog-wheel last mentioned, and a chain of regular gears for transmitting the movement of the said pinion to the drive-wheel of the carrying mechanism, substantially as set forth.

62. In a type-distributing machine such as described, the combination of a carrying mechanism for receiving and conveying the type to their destinations, a channel for guiding the said carrying mechanism, wheels in the said channel for guiding and propelling the said carrying mechanism, and flanges passing through the said channel and rounded so as to extend over the said wheels and guide the said carrying mechanism into the said channel, substantially as set forth.

63. In a type-distributing machine such as described, a channel for guiding the carrying mechanism for conveying the type to their destinations, consisting of small sections secured rigidly upon the frame of the machine, so as to form the said channel with unbroken wall, substantially as described, whereby the length of the said channel may be reduced or enlarged.

64. In a type-distributing machine such as described, the combination of a carrying mechanism for receiving and conveying the type to their destinations, having an elevator for raising the type held in the said carrying mechanism above the surface thereof, a channel for guiding the said carrying mechanism, plates extending across the said channel next the said carrying mechanism having individual distinguishing marks corresponding to some one denomination of type being distributed, and mechanism placed in the path of the said elevator for causing the same to raise the type above the surface of the carrying mechanism, substantially as set forth.

65. In a type-distributing machine such as described, the combination of a carrying mechanism for receiving and conveying the type to their desinations, having elevators for raising the type held in the said carrying mechanism above the surface thereof, a channel for guiding the said carrying mechanism, plates extending across the said channel having projections of varied arrangement next the said carrying mechanism, and cams placed in the path of the said elevators for causing the same to raise the type above the surface of the said carrying mechanism, substantially as set forth.

66. In a type-distributing machine such as described, the combination of a carrying mechanism for receiving and conveying the type to their destinations, having elevators for raising the type held in the said carrying mechanism above the surface thereof, a channel for guiding the said carrying mechanism, plates extending across the said channel having projections of varied arrangements next the said carrying mechanism, cams placed in the path of the said elevators for causing the same to raise the type above the surface of the said carrying mechanism, and a spring for allowing the parts to yield when an obstruction prevents the said type from rising, substantially as set forth.

67. In a type-distributing machine such as described, the combination of a carrying mechanism for receiving and conveying the type to their destinations, having elevators for raising the type held in the said carrying mechanism above the surface thereof, a channel for guiding the said carrying mechanism, plates extending across the said channel having projections of varied arrangements corresponding to the arrangement of slots in some one denomination of type being distributed, spring inclines placed in the path of the said elevators for causing them to raise the type above the surface of the said carrying mechanism against the said plates extending across the channel, and a device for interposing itself under the said elevators for retaining the said type in the raised position, substantially as set forth.

68. In a type-distributing machine such as described, the combination of a carrying mechanism for receiving and conveying the type to their destinations, having elevators for raising the type held in the said carrying mechanism above the surface thereof, a channel for guiding the said carrying mechanism, plates extending across the said channel, having projections of varied combinations corresponding to an arrangement of slots upon some one denomination of type being distributed, a cam placed in the path of the said elevators for causing them to raise the type above the surface of the said carrying mechanism, a device for interposing itself under the said elevators for retaining the said type in the raised position, and a trigger connected to the said device for retaining the type in raised position placed so as to be tripped by the type when raised above the projections on the said plate, substantially as set forth.

69. In a type-distributing machine such as described, the combination of a carrying mechanism provided with distinct chambers, having elevators mounted in the said chambers for raising the said type above the surface of the same, the ends of which extend beyond the said chambers, a channel for guiding the said carrying mechanism provided with grooves to receive the ends of the said elevators, cams extending into the said grooves for raising the said elevators, and springs connected to the said cams for allowing the same to yield when an obstruction prevents the said elevators from rising, substantially as set forth.

70. In a type-distributing machine such as described, the combination of a carrying mechanism provided with distinct chambers, having elevators mounted in the said chambers for raising the said type above the surface of the same, the ends of which extend beyond the said chambers, a channel for guiding the said carrying mechanism provided with grooves to receive the ends of the said elevators, cams extending into the said grooves for raising the said elevators, plates extending across the said channel directly above the said cams and provided upon their surface next the said carrying mechanism with projections of varied arrangements, and a spring attached to the said cams to allow the same to yield when the type held in the said chambers are prevented from rising, substantially as set forth.

71. In a type-distributing machine such as described, the combination of a carrying mechanism provided with distinct chambers, having elevators mounted in the said chambers for raising the said type above the surface of the same, a channel for guiding the said carrying mechanism, cams extending into the path of the said elevators for raising the same and causing them to expel the type above the surface of the said carrying mechanism, plates extending across the said channel directly above the said cams, runners parallel to the said channel and corresponding in their lateral arrangement to the arrangement of the slots in some one denomination of type being distributed, and a spring attached to the said cams to allow the same to yield when the type held in the said chambers are prevented from rising, substantially as set forth.

72. In a type-distributing machine such as described, the combination of a carrying mechanism for receiving and conveying the type to their destinations, having elevators for raising them above its surface, cams for raising the said elevators, and an ejector moving transversely across the said carrying mechanism close to the surface thereof for expelling the type from the said carrying mechanism when raised above the surface of the same, substantially as set forth.

73. In a type-distributing machine such as described, the combination of a carrying mechanism for receiving and conveying the type to their destinations, having elevators for raising them above its surface, cams for raising the said elevators, devices for retaining them so raised while being extracted, and an ejector moving transversely across the said carrying mechanism close to the surface thereof for expelling the type from the said carrying mechanism when raised above the surface of the same, substantially as set forth.

74. In a type-distributing machine such as described, the combination of a carrying mechanism provided with distinct chambers for receiving and conveying the type to their destinations, a channel for guiding the said carrying mechanism, plates extending across the said channel having projections upon the surface next the said carrying mechanism corresponding to an arrangement of slots in some one denomination of type being distributed, elevators for protruding the type out of the chambers of the said carrying mechanism, and an ejector moving transversely across the said carrying mechanism between the said plates for expelling the type when raised out of the said carrying mechanism against the said plates, substantially as set forth.

75. In a type-distributing machine such as described, the combination of a carrying mechanism for receiving and conveying the type to their destinations, having elevators for protruding the type from the said carrying mechanism, laterally-moving extractors for extracting the type from the said carrying mechanism when so protruded, passing over the said carrying mechanism, and a driving mechanism having a variable movement for imparting an alternately fast and slow movement to the said extracting mechanism timed with and connected to the carrying mechanism so as to pass over each succeeding type carried by the same, substantially as set forth.

76. In a type-distributing machine such as described, the combination of a carrying mechanism for receiving and conveying the type to their destinations, elevators for protruding the type from the said carrying mechanism, laterally-moving extractors for extracting the said type from the carrying mechanism when protruded passing over the said carrying mechanism, and a driving mechanism having a variable movement for imparting to the said carrying mechanism an alternately fast and slow movement timed with and connected to the extracting mechanism so as to present a type-chamber for each operation of the same, substantially as set forth.

77. In a type-distributing machine such as described and in the extracting mechanism thereof, the combination of the reciprocating planer for extracting the type from the carrying mechanism, a rod connected pivotally at the one end to a drive-wheel and at the other to a guide-rod, a drive-wheel, and a suitable sliding connection between the said planer mounted upon the rod attached to the drive-wheel and between the mountings of the same, substantially as set forth.

78. In a type-distributing machine such as described and in the extracting mechanism thereof, the combination of a reciprocating planer for extracting the type from the carrying mechanism, a drive-wheel, and a lever fulcrumed between the said planer and drive-wheel and provided with a sliding connection to each, substantially as set forth.

79. In a type-distributing machine such as described and in the extracting mechanism thereof, the combination of a mechanism for protruding the type from the carrying mechanism, an arm connected to the mechanism for being interposed in the path of the extracting-plunger when the said mechanism is operated, a reciprocating plunger for extracting the type when protruded by the said mechanism, and a spring-buffer attached to the said plunger and placed in the path of the said arm for resetting the same, substantially as set forth.

80. In a type-distributing machine such as described and in the extracting mechanism thereof, the combination of a mechanism for protruding the type from the carrying mechanism, an arm connected to the mechanism for protruding the type for being interposed in the path of an extracting-plunger when the said mechanism is operated, a trigger connected to the said arm and actuating the same placed so as to be operated by the mechanism for sorting the type, and a plunger for extracting the type when protruded by the said mechanism and for resetting the said mechanism, substantially as set forth.

81. In a type-distributing machine such as described, the combination of a feed-plate moving transversely to the column of type being distributed for separating the succeeding lines therefrom, a reciprocating driving mechanism for actuating the said feed-plate, and a spring interposed between said plate and driving mechanism which allows the said plate to yield when the strain on any of the parts reaches a predetermined tension, substantially as set forth.

82. In a type-distributing machine such as described, the combination of a feed-plate moving transversely to a column of type being distributed for extracting the succeeding lines therefrom, a driving mechanism for operating the said feed-plate, a latch for being interposed between the said driving mechanism and feed-plate, and a spring for retaining the said latch in position, substantially as set forth.

83. In a type-distributing machine such as described, the combination of a feed-plate moving transversely to a column of type being distributed for extracting the succeeding lines therefrom, a driving mechanism for operating the said feed-plate, a latch provided with a head pivotally attached thereto for being interposed between the said feed-plate and driving mechanism, a shaft for retaining the said head in position, and a spring for retaining the said shaft in its normal position, substantially as set forth.

84. In a type-distributing machine such as described, the combination of a feed-plate moving transversely to a column of type being distributed for extracting the succeeding lines therefrom, a driving mechanism for operating the said feed-plate, and a latch for being interposed between the said feed-plate and driving mechanism, which consists in the combination of a head pivotally attached to the arm of the said latch for being interposed between the said feed-plate and driving mechanism, a shaft pivotally mounted in the said latch and provided with a pin extending behind the said head to retain it in position, a lever for maintaining the said shaft in such a position as to prevent the said pivotal head from escaping from between the said feed-plate and guiding mechanism, and a spring for retaining the said lever in position, substantially as set forth.

85. In a type-distributing machine such as described, the combination of a side feed for advancing the succeeding type of the separate lines into the path of a feed-bar for extracting them therefrom, and a latch pivotally mounted so as to extend into the path of the said side feed for preventing the same advancing when unaccompanied by a line of type, substantially as set forth.

86. In a type-distributing machine such as described, the combination of a feed-plate moving transversely to the column being distributed for extracting the succeeding lines therefrom, a side feed for advancing the said lines into the path of a feed-bar for extracting the succeeding type therefrom, and a latch provided with a double-beveled face extending toward the said feed-plate and path of the feed-bar and pivotally mounted so as to extend into the path of the said feed-bar for preventing the same advancing when unaccompanied by a line of type, substantially as set forth.

87. In a type-distributing machine such as described and in the transferring mechanism thereof, the combination of thrusting-feet mounted in the said mechanism for expelling the type therefrom, and gearing connected to the driving mechanism of the machine for operating the same, and a spring-connector interposed in said gearing for relieving the strain, substantially as described.

88. In a type-distributing machine such as described and in the transferring mechanism thereof, the combination of thrusting-feet mounted in the said mechanism for expelling the type therefrom, and the gearing consisting of a bent shaft extending obliquely across the periphery of one of the driving-wheels of the feeding mechanism, the said driving-wheel, pins set obliquely across the same and at varying intervals, a rod in separate parts connecting the said shaft and thrusting-feet, and a spiral spring for holding the said parts of the rod together, substantially as set forth.

89. In a type-distributing machine such as described, the combination of a feeding mechanism for advancing the type singly, a movable transferring mechanism for receiving and delivering the type to a carrying mechanism adapted to move with the same while so delivering, and a latch lying in the path of and rocked by the frame of the said transferring mechanism and extending into the path of the driving mechanism when the latch is rotated by the movement of the said transferring mechanism, substantially as set forth.

90. In a type-distributing machine such as described, the combination of a feed mechanism for advancing the type singly, a transferring mechanism for receiving and delivering the type to a carrying mechanism and adapted to move with the same while so delivering, a latch lying in the path of and rocked by the frame of the said transferring mechanism and provided with a spring extending into a cam-shaped groove in the side of a driving-wheel of the driving mechanism of the machine, and a head for being interposed in the path of the driving mechanism when the said spring is forced in the said groove, substantially as set forth.

91. In a type-distributing machine such as described, the combination of a feeding mechanism for advancing the type singly, a transferring mechanism for receiving and delivering the said type to a carrying mechanism, a latch lying in the path of and rocked by the frame of the said transferring mechanism for being interposed in the path of the driving mechanism of the machine, and a buffer-spring attached to the said latch to take up the strain upon the same when brought into operation, substantially as set forth.

92. In a type-distributing machine such as described, the combination of a feeding mechanism for advancing the type toward the carrying mechanism singly, a driving-wheel of the said feeding mechanism, a pawl pivotally attached to the said wheel, a drum secured to a sleeve on the driving-shaft and provided with a notch corresponding to the said pawl resting against the said driving-wheel, and a spring for retaining the said pawl in the said notch, substantially as described.

93. In a type-distributing machine such as described and in the driving mechanism thereof, the combination of a general driving-shaft of the machine, a collar rigidly attached to the said shaft having an inclined face, a sleeve mounted upon the said shaft and provided next to the said collar with a face corresponding to the face upon the same, and a spring for forcing the two faces together, substantially as set forth.

94. In a type-distributing machine such as described and in the carrying mechanism thereof, the combination of a driving-shaft connected to the general driving mechanism, a sleeve mounted upon the said shaft, the driving-wheel of the said carrying mechanism rigidly attached to the said sleeve, and a spring-connection between the said sleeve and shaft for allowing the same to operate independently upon reaching a predetermined tension, substantially as set forth.

95. In a type-distributing machine such as described and in the carrying mechanism thereof, the combination of a driving-shaft connected to the general driving mechanism, a sleeve mounted upon the said shaft, the driving-wheel of the said carrying mechanism rigidly attached to the said sleeve, a disk rigidly attached to the said sleeve provided with a notch in its surface, and a latch attached to the one of the said driving-shaft and disk and engaging the other, substantially as set forth.

96. In a type-distributing machine such as described and in the carrying mechanism thereof, the combination of a driving-shaft connected to the general driving mechanism, a sleeve mounted upon the said shaft, the driving-wheel of the said carrying mechanism rigidly attached to the said sleeve, a disk rigidly attached to the said sleeve and provided with a notch in its surface, a latch attached to the said driving-shaft for engaging the said notch, a finger pivotally mounted in the frame of the said latch provided with a pin extending from the side of the same, a spring for depressing the said finger, a double lever mounted pivotally in the frame of the said latch and provided with long and short arms, the former extending under the said pin in the side of the finger and the latter over the end of the lever, substantially as set forth.

97. In a type-distributing machine substantially such as described, the combination of a feeding mechanism for advancing the type singly from the column being distributed, a carrying mechanism receiving the type from said feeding mechanism, a latch co-operating with and held out of engagement by said carrying mechanism when in motion and intersecting the path of the feeding mechanism when not held out of engagement, whereby the feeding mechanism is arrested by the stopping of the carrying mechanism, substantially as described.

98. In a type-distributing machine substantially such as described, the combination of a feed-bar for delivering the type singly, said bar having a notch therein, and the carrying mechanism operating in harmony with said feed-bar, and a movable rod controlling the carrying mechanism and intersecting the path of the said feed-bar and engaging the notch therein when the bar and carrying mechanism are not operating in harmony, substantially as described.

99. In a type-distributing machine, the combination, with the carrying mechanism for conveying the type to their individual receivers and a transferring mechanism, substantially as described, having thrusting-feet thereon connected to the driving mechanism, of a movable jaw connecting the carrying and transferring mechanisms while the type are being delivered from one to the other and adapted to be moved out of engagement by the thrusting-feet, substantially as described.

In testimony whereof I have hereunto set my hand this 23d day of May, A. D. 1888.

JOHN PATTEN.

Witnesses:
J. J. KENNEDY,
J. A. HOVEY.